(12) United States Patent
Mitani et al.

(10) Patent No.: US 11,999,179 B2
(45) Date of Patent: Jun. 4, 2024

(54) ELECTROSTATIC PRINTING METHOD

(71) Applicant: ePrint Laboratories Co., Ltd., Tokyo (JP)

(72) Inventors: Yuji Mitani, Tokyo (JP); Kazuhiko Honjyo, Tokyo (JP)

(73) Assignee: ePrint Laboratories Co., Ltd., Tokyo (JP)

( * ) Notice: Subject to any disclaimer, the term of this patent is extended or adjusted under 35 U.S.C. 154(b) by 0 days.

(21) Appl. No.: 17/888,700

(22) Filed: Aug. 16, 2022

(65) Prior Publication Data

US 2023/0059189 A1  Feb. 23, 2023

(30) Foreign Application Priority Data

Aug. 17, 2021 (JP) ................. 2021-132869
Aug. 17, 2021 (JP) ................. 2021-132875
Sep. 7, 2021 (JP) ................. 2021-145598

(51) Int. Cl.
  *G03G 15/16* (2006.01)
  *B41M 1/10* (2006.01)
  *B41M 1/12* (2006.01)
  *G06F 3/041* (2006.01)

(52) U.S. Cl.
  CPC .............. *B41M 1/125* (2013.01); *B41M 1/10* (2013.01); *G03G 15/1635* (2013.01); *G06F 3/0412* (2013.01); *B41M 2205/34* (2013.01); *G06F 2203/04103* (2013.01)

(58) Field of Classification Search
  None
  See application file for complete search history.

(56) References Cited

FOREIGN PATENT DOCUMENTS

| JP | H08-019272 A | 1/1996 |
|----|-------------|--------|
| JP | 2007-134422 A | 5/2007 |
| JP | 2020-055261 A | 4/2020 |

OTHER PUBLICATIONS

Seino et al., "Copying Processes of Latent Electrostatic Image Transfer," Journal of the Xerographic Society of Japan, 17 (3): 2-16 (1979).
Seino et al., "Copying Processes of Latent Electrostatic Image Transfer," Denshi Shashin Gakkaishi (Electrophotography), 17 (3): 2-16 (1979).

*Primary Examiner* — Roy Y Yi
(74) *Attorney, Agent, or Firm* — Morgan, Lewis & Bockius LLP

(57) ABSTRACT

The electrostatic printing method of the present invention comprises arranging and adhering an original plate which is composed of an electrode and a plate layer having built-in a letterpress, intaglio plate, or gravure plate pattern or a mask sheet having ion-permeable openings on one or both sides of an image receiving sheet having an electrode and an image receiving layer, and forming a predetermined electrostatic pattern on the image receiving layer of the image receiving sheet by applying a voltage between the electrode of the original plate and the electrode of the image receiving sheet or by performing ion irradiation through the mask sheet.

24 Claims, 13 Drawing Sheets

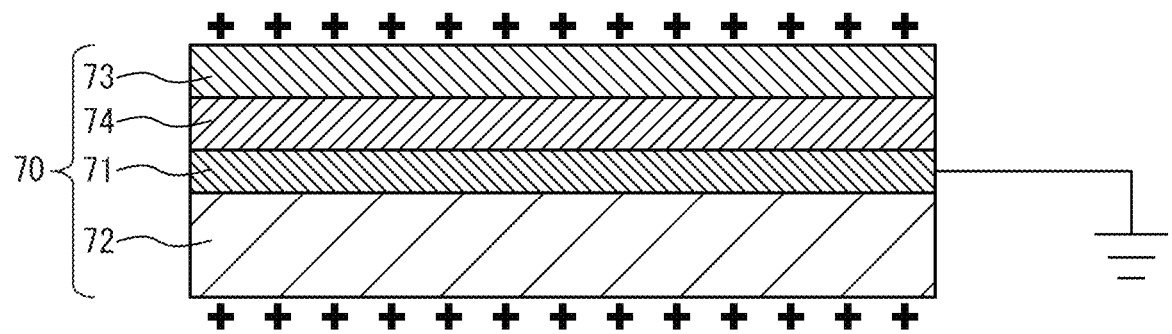
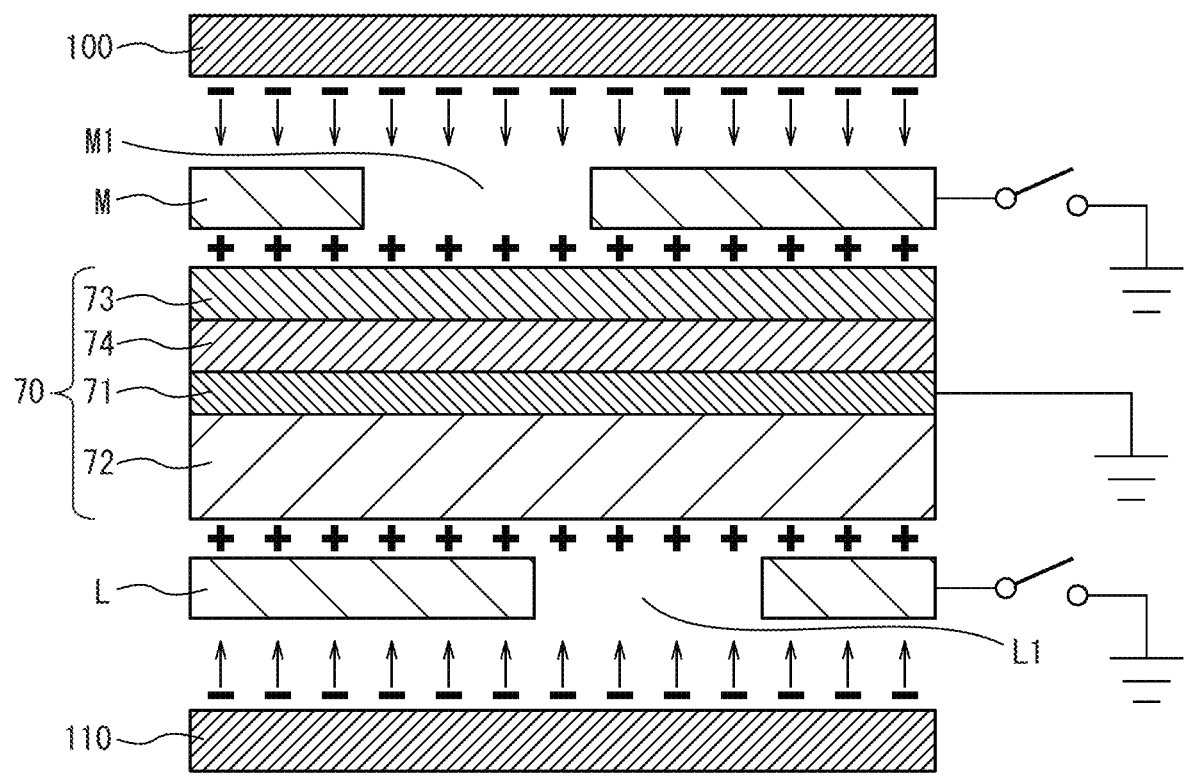

ELECTROSTATIC PRINTING METHOD

FIELD

The present invention relates to an electrostatic printing method which comprises forming an electrostatic pattern on an image receiving sheet using an original plate having built-in a letterpress, intaglio plate, or gravure plate pattern and/or a mask sheet having predetermined ion-permeable openings.

BACKGROUND

Chester Carlson of the United States invented the world's first practical technique for creating images using static electricity. The technique related to this invention was commonly called the Carlson method or the Xerography method, but research has progressed academically as an image formation technique, and the scientific name is called Electrophotography, which is referred to as the electrophotographic method in Japan.

Copiers and printers made using this technology are now indispensable for office work.

In this technique, an optical image referred to as a "photograph" is formed as an electrostatic pattern with static electricity and a photoconductor (optical semiconductor), and is developed with charged fine particles referred to as toner. This technique has developed as a perfect technology for copiers which instantly prints on paper and outputs images which change from page to page. The most advanced developments relate to toner, which is a developing agent, and developing technologies. Powder toner is made into fine particles having a diameter up to approximately 6 μm, and uniform particle size and uniform charge have been realized to improve resolution and transfer stability. Furthermore, finely micronized liquid toner has a submicron size, whereby stability of the developing liquid can be ensured, enabling a resolution superior to that of printing ink. Furthermore, functional toners and developer methods have been developed which can be applied to powder or liquid, such as toner containing metal as color toner, a method of developing with metal itself, and toner that can be plated, as described in Patent Literature 2 below.

However, to fully demonstrate the characteristics of these functional toners, the electrophotographic method is limited. This is because of the basic element of creating an electrostatic pattern on a photoconductor. Specifically, the electrostatic pattern on the photoconductor must be developed by toner and the toner must be transferred to the target material. Naturally, this method realizes high-definition, high-speed printing without plates, but during transfer, the resolution will always decrease, and conductive toner cannot be transferred except by adhesion. Furthermore, current photoconductors have analog characteristics, and it is difficult to accurately print dots and lines of 10 μm and dots and lines of 100 μm or more at the same time at high speed.

Various attempts have been made in the past to directly develop electrostatic patterns. As shown in Non-Patent Literature 1, there is one attempt which has reached commercialization; an electrostatic transfer system which transfers an electrostatic pattern itself from a photoconductor and directly develops it. However, due to the special nature of the transfer paper and the principle wherein the electrostatic pattern is created by a separating discharge, the resolution is lower than that of the pattern on a photoconductor, and such transfer systems are not produced at present. Multi-stylus and ion beam deflecting methods have been commercialized as devices which directly draw electrostatic patterns, but they have been replaced by inkjet methods due to the limitations of electrode processing accuracy and low resolution due to the spread of discharged ions.

Furthermore, though it is an electrostatic pattern formation method for electrostatic actuators, Patent Literature 1 below proposes providing a partition wall around an electrode and limiting the discharge range to the electrode of the electrostatic pattern to obtain fidelity. However, the method of Patent Literature 1 cannot be used to create a similar pattern to printed or electrophotographic one.

Combining high-definition electrostatic patterns with ever-evolving toners has the potential for printing with unprecedented effects and performance, and a method of directly creating a high-definition electrostatic pattern on an insulator other than a photoconductor is desired.

Thus, the present inventors have proposed a practical high-definition electrostatic printing method which creates an image using static electricity that is comparable to or surpasses conventional printing without the use of a photoconductor (Patent Literature 3).

According to a first aspect of the invention described in Patent Literature 3, there is provided a high-definition electrostatic printing method wherein an image receiving sheet having a back surface integral with a conductive layer, which is a second electrode, is adhered onto an original plate, which is composed of a first electrode having uniform conductivity across an entire surface thereof and a plate layer composed of a material adhered onto the first electrode and having a suitable uniform thickness, and in which a letterpress, intaglio plate, or gravure plate pattern is formed on the plate layer, and an appropriate voltage sufficient to discharge the gap of the letterpress, intaglio plate, or gravure plate pattern is applied between the first electrode of the original plate and the second electrode of the image receiving sheet to form an electrostatic pattern corresponding to the letterpress, intaglio plate, or gravure plate on the image receiving sheet.

Furthermore, according to a second aspect of the invention described in Patent Literature 3, there is provided a high-definition electrostatic printing method wherein an image receiving sheet is pressure-bonded, from a back surface with a conductive second electrode, onto an original plate, which is composed of a first electrode having uniform conductivity across an entire surface thereof and a plate layer composed of a material adhered onto the first electrode and having a suitable uniform thickness, and in which a letterpress, intaglio plate, or gravure plate pattern is formed on the plate layer, and an appropriate voltage sufficient to discharge the gap of the letterpress, intaglio plate, or gravure plate pattern is applied between the first electrode of the original plate and the second electrode to form an electrostatic pattern corresponding to the letterpress, intaglio plate, or gravure plate on the image receiving sheet.

CITATION LIST

[PTL 1] Japanese Unexamined Patent Publication (Kokai) No. 8-19272
[PTL 2] Japanese Unexamined Patent Publication (Kokai) No. 2007-134422
[PTL 3] Japanese Unexamined Patent Publication (Kokai) No. 2020-55261
[NPL 1] Seino, Tanaka, Inoue, Tajima: DENSHI SHASHIN GAKKAISHI (Electrophotography), Vol. 17, No. 3, p. 2

SUMMARY

Technical Problem

The electrostatic pattern on the image receiving sheet becomes a visible pattern by developing with charged particles. When the charged particles are particles which can be plated, by performing a plating process after developing with the charged particles, a high-definition electrode circuit pattern is formed on the image receiving sheet.

Capacitive touch panels are an example of an application for image receiving sheets on which a high-definition electrode circuit pattern is formed. However, application to a capacitive touch panel has the following problems.

In the case of the first aspect of the invention described in Patent Literature 3 above, since the image receiving sheet has an integrated image receiving layer and a second electrode, there is a problem in that the sensitivity of the touch panel is reduced due to the influence of the second electrode when the capacitive touch panel is operated. Further, since the image receiving sheet has an image receiving layer and an integral second electrode, it is difficult to reduce the thickness of the capacitive touch panel.

Furthermore, according to the second aspect of the invention described in Patent Literature 3, when applied to a capacitive touch panel, the image receiving sheet (image receiving layer) is separated from the second electrode, and thus, there are no problems regarding reduction in the sensitivity of the capacitive touch panel. However, from the viewpoint of handling in the electrostatic pattern formation process, it is difficult to make the image receiving sheet (image receiving layer) thin, whereby it is difficult to make the capacitive touch panel thin.

A first invention of the present disclosure proposes a high-definition electrostatic printing method which solves the problems described above.

Furthermore, the high-definition electrostatic printing method using an original plate has the following problems. Specifically, the original plate used in the high-definition electrostatic printing method is composed of a first electrode having uniform conductivity on an entire surface thereof and a plate layer integrally adhered on the first electrode and having an appropriate uniform thickness, and a letterpress, intaglio plate, or gravure plate pattern is formed on the plate layer. Since the production of an original plate is expensive and time-consuming, although the method is suitable for the mass production of limited variety, the method is not suitable for mass production of high variety. Furthermore, it is not easy to respond to individual requests such as additions to or modifications of the electrostatic pattern.

A second invention of the present disclosure proposes an electrostatic printing method which solves the problems described above.

Further, in application fields such as electronic components using an electrode circuit pattern, an X electrode circuit pattern and a Y electrode circuit pattern are often bonded together using an adhesive layer or the like, and the patterns are used as a set. However, in the prior art, since both patterns are processed separately from the electrostatic pattern to the electrode circuit pattern, the difference of dimensional changes of the electrode circuit pattern with respect to the electrostatic pattern may occur due to differences in the process history such as moisture absorption and drying. Furthermore, there are limits to alignment accuracy when bonding the patterns. As a result, the positional relationship between the two patterns may not be as accurate as the design, and it is difficult to produce electronic components and the like which satisfy the quality requirements.

A third invention of the present application proposes a double-sided electrostatic printing method which solves the problems described above.

Solution to Problem

The present invention achieves the objects described above by the following means.

<1> An electrostatic printing method, comprising using an image receiving sheet, which is composed of a second electrode and an image receiving layer which is laminated on the second electrode and which can be peeled from the second electrode, and an original plate, which is composed of a first electrode having a uniform conductivity across an entire surface thereof and a plate layer having a suitable uniform thickness composed of an electrically-insulative, conductive, or semiconductive material which is integrally adhered on the first electrode and which has built-in a letterpress, an intaglio plate, or a gravure plate pattern, laminating the image receiving sheet onto the original plate so that the plate layer of the original plate and the image receiving layer of the image receiving sheet are adhered, and applying an appropriate voltage, which is sufficient to discharge the gap of the letterpress, the intaglio plate, or the gravure plate pattern, between the first electrode of the original plate and the second electrode of the image receiving sheet to form an electrostatic pattern corresponding to the letterpress, the intaglio plate, or the gravure plate pattern on the image receiving layer of the image receiving sheet.

<2> The electrostatic printing method according to <1>, comprising, prior to laminating the image receiving sheet onto the original plate, performing pre-charge processing on the image receiving sheet.

<3> The electrostatic printing method according to <1>, comprising developing the electrostatic pattern formed on the image receiving sheet with charged particles using a dry development method or a wet development method in electrophotographic technology.

<4> The electrostatic printing method according to <3>, wherein the charged particles are particles which can be plated.

<5> The electrostatic printing method according to <1>, wherein the electrostatic pattern is for producing an electrode circuit pattern of a touch panel.

<6> The electrostatic printing method according to <1>, comprising peeling the image receiving layer of the image receiving sheet from the second electrode, and producing a touch panel using the image receiving layer.

<7> An electrostatic printing method, comprising adhering a mask sheet a which comprises predetermined ion-permeable openings and in which an entire surface excluding at least these ion-permeable openings is conductive, onto a pattern formation surface of an image receiving sheet composed of an electrically insulating material, further arranging a back surface electrode on a surface opposite the pattern formation surface of the image receiving sheet, performing ion irradiation through the mask sheet a, and peeling the mask sheet a from the image receiving layer to form an electrostatic pattern A corresponding to the ion-permeable openings on the pattern formation surface of the image receiving layer.

<8> The electrostatic printing method according to <7>, comprising, prior to adhering the mask sheet a on the image receiving sheet, performing pre-charge processing on the image receiving sheet with a charge having a polarity opposite the charge for forming the electrostatic pattern A.

<9> The electrostatic printing method according to <7>, wherein the back surface electrode is a conductive layer or a sheet with a conductive layer laminated on the surface opposite to the pattern formation surface of the image receiving sheet.

<10> The electrostatic printing method according to <7>, wherein the ion irradiation is performed by an ion irradiation means by corona discharge.

<11> The electrostatic printing method according to <7>, comprising developing the electrostatic pattern A formed on the image receiving sheet with charged particles using a dry development method or a wet development method in electrophotographic technology.

<12> The electrostatic printing method according to <11>, wherein the charge particles are particles which can be plated.

<13>. The electrostatic printing method according to <7>, further comprising, after forming the electrostatic pattern A, adhering a mask sheet b comprising predetermined ion-permeable openings and in which at least an entire surface excluding the ion-permeable openings is conductive onto the pattern formation surface on which the electrostatic pattern A is formed in advance, further arranging a back surface electrode on a surface opposite the pattern formation surface of the image receiving sheet, performing ion irradiation through the mask sheet b, and peeling the mask sheet b from the image receiving sheet to form an electrostatic pattern B corresponding to the ion-permeable openings of the mask sheet b adjacent to the electrostatic pattern A or partially overlapped with the electrostatic pattern A.

<14> The electrostatic printing method according to <13>, wherein the back surface electrode is a conductive layer or a sheet with a conductive layer laminated on the surface opposite the pattern formation surface of the image receiving sheet.

<15> The electrostatic printing method according to <13>, wherein the ion irradiation is performed by an ion irradiation means by corona discharge.

<16> The electrostatic printing method according to <13>, comprising developing the electrostatic pattern A and the electrostatic pattern B formed on the image receiving sheet with charged particles using a dry development method or a wet development method in electrophotographic technology.

<17> The electrostatic printing method according to <16>, wherein the charge particles are particles which can be plated.

<18> A double-sided electrostatic printing method, comprising the steps of:

arranging:

an original plate E, which comprises a second electrode having a uniform conductivity across an entire surface thereof and a plate layer having a suitable uniform thickness composed of an electrically-insulating, conductive, or semiconductive material which is integrally adhered on the second electrode and which has built-in a letterpress, intaglio plate, or gravure plate pattern, or a mask sheet L which comprises predetermined ion-permeable openings, and in which at least an entire surface excluding the ion-permeable openings is conductive, and an original plate F, which comprises a third electrode having a uniform conductivity across an entire surface thereof and a plate layer having a suitable uniform thickness composed of an electrically-insulating, conductive, or semiconductive material which is integrally adhered on the third electrode and which has built-in a letterpress, intaglio plate, or gravure plate pattern, or a mask sheet M which comprises predetermined ion-permeable openings, and in which at least an entire surface excluding the ion-permeable openings is conductive, so as to face each other, and so that the plate layers face each other when the original plate E and the original plate F are used, so as to provide a gap therebetween, arranging, in this gap, an image receiving sheet comprising a conductive layer, which is a first electrode, and image receiving layers laminated on both surfaces of the conductive layer, adhering the plate layer of the original plate E or the mask sheet L with the original plate E side or mask sheet L side of image receiving layer of the image receiving sheet, and the plate layer of the original plate F or the mask sheet M with the original plate F side or mask sheet M side of image receiving layer of the image receiving sheet, applying an appropriate voltage sufficient to discharge the gap of the letterpress, intaglio plate, or gravure plate pattern of the plate layer of the original plate E between the second electrode of the original plate E and the first electrode of the image receiving sheet to form, on the image receiving layer of one surface of the image receiving sheet, an electrostatic pattern corresponding to the letterpress, intaglio plate, or gravure plate pattern of the plate layer of the original plate E, or peeling the mask sheet L from the image receiving sheet to form thereon an electrostatic pattern corresponding to the ion-permeable openings of the mask sheet L after ion irradiation through the mask sheet L has been performed, and applying an appropriate voltage sufficient to discharge the gap of the letterpress, intaglio plate, or gravure plate pattern of the plate layer of the original plate F between the third electrode of the original plate F and the first electrode of the image receiving sheet to form, on the image receiving layer of the opposite surface of the image receiving sheet, an electrostatic pattern corresponding to the letterpress, intaglio plate, or gravure plate pattern of the plate layer of the original plate F, or peeling the mask sheet M from the image receiving sheet to form an electrostatic pattern corresponding to the ion-permeable openings of the mask sheet M after ion irradiation through the mask sheet M has been performed.

<19> The double-sided electrostatic printing method according to <18>, wherein the original plate E and the original plate F are used.

<20> The double-sided electrostatic printing method according to <18>, wherein the mask sheet L and the mask sheet M are used.

<21> The double-sided electrostatic printing method according to <18>, wherein the original plate E and the mask sheet M are used.

<22> The double-sided electrostatic printing method according to <18>, comprising performing pre-charge processing on the image receiving sheet prior to adhering the original plate E or the mask sheet L, and the original plate F or the mask sheet M with the image receiving sheet.

<23> The double-sided electrostatic printing method according to <18>, comprising developing the electrostatic patterns formed on the image receiving sheet with charged particles using a dry development method or a wet development method in electrophotographic technology.

<24> The double-sided electrostatic printing method according to <23>, wherein the charged particles are particles which can be plated.

Advantageous Effects of Invention

Since the first invention is based on an electrostatic pattern which is engraved in a pattern without the use of separating discharge and which is created only by discharged ions in a closed and limited gap, high-definition printing can be performed without the spread of charged ions on the image receiving layer. Furthermore, by changing only the engraving depth, an electrostatic pattern having a different charge amount can be obtained on the image receiving layer while maintaining the high definition of the pattern. The electrostatic pattern on the image receiving layer becomes a visible pattern by developing with charged particles. When the charged particles are particles which can be plated, a high-definition electrode circuit pattern is formed on the image receiving layer by performing a plating process after developing with charged particles. Since the image receiving layer forming the high-definition electrode circuit pattern can be peeled from the second electrode and used for a capacitive touch panel, there are no problems in reduction in the sensitivity of the capacitive touch panel, whereby the capacitive touch panel can be made thinner.

Since the second invention is based on an electrostatic pattern created by ions which have passed through the ion-permeable opening of the mask sheet without using separating discharge, an electrostatic pattern with no spread of charged ions can be formed on the pattern formation surface of the image receiving sheet. Furthermore, by adjusting the position of the ion-permeable opening of the mask sheet in a state in which an electrostatic pattern A is formed in advance on the pattern formation surface of the image receiving sheet, an electrostatic pattern B can be formed adjacent to the electrostatic pattern A or partially overlapped with the electrostatic pattern A. The electrostatic pattern of the pattern formation surface of the image receiving sheet becomes a visible pattern by developing with charged particles of a charge having the opposite polarity to the electrostatic pattern. Before the image receiving sheet is brought into close contact with the mask sheet, by performing pre-charge processing on the image receiving sheet with a charge having the opposite polarity to the charge for forming the electrostatic pattern, the portions other than the electrostatic pattern become the same polarity as the charged particles and are not developed. When the charged particles are particles which can be plated, the electrode circuit pattern is formed on the pattern formation surface of the image receiving sheet by performing a plating process after developing with the charged particles.

Since the third invention is based on (1) an electrostatic pattern created by discharged ions generated in the gap by applying a voltage between the electrode of the original plate and the electrode of the image receiving sheet without using separating discharge, or (2) an electrostatic pattern created by ions which have passed through the ion-permeable opening of the mask sheet, an electrostatic pattern with no spread of charged ions can be formed on the image receiving layers on both sides of the image receiving sheet. When the two cases are compared with each other, in the case of (1), the resolution can be controlled by changing the width of the gap, and an electrostatic pattern having a different charge amount can be obtained by changing the depth of the gap, which is suitable for a high-definition electrostatic pattern formation. In the case of (2), since mask sheets are easier to produce than original plates, it is suitable for responding to individual requests such as additions to and modifications of the electrostatic pattern.

The electrostatic pattern on the image receiving layers on both surfaces of the image receiving sheet become a visible pattern by developing with charged particles. When the charged particles are particles which can be plated, the electrode circuit pattern is formed as a set on the image receiving layers on both sides of the image receiving sheet by performing the plating process after developing with the charged particles. Since the positional relationship between the electrode circuit patterns of the image receiving layers on both sides of the image receiving sheet is as accurate as the design value, not only can electronic parts and the like satisfying quality requirements be produced using this, but also the electronic parts and the like can be made thinner.

BRIEF DESCRIPTION OF DRAWINGS

FIG. 16 is a view showing a step of performing pre-charge processing on both sides of an image receiving sheet.

FIG. 17 is a view showing a step in which mask sheets are arranged on both sides of an image receiving sheet and ion irradiation is performed through the mask sheets.

DESCRIPTION OF EMBODIMENTS

The embodiments of the present invention will be described in detail below. Note that the present invention is not limited to the following embodiments, and various changes can be made within the scope of the spirit of the present invention.

<First Invention>

In order to facilitate understanding, the structure of the first invention and the electrostatic pattern formation process will be described with reference to the basic conceptual diagrams shown in FIGS. 1 to 3.

Figure 1:
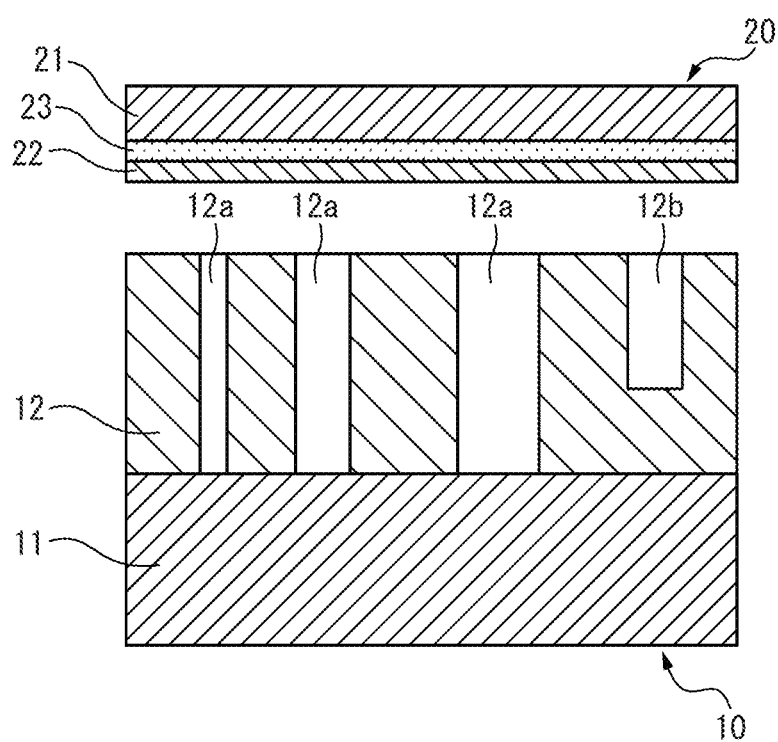
FIG. 1 is a view showing the basic structure of a first invention.

FIG. 1 shows the structures of an original plate 10 and an image receiving sheet 20, the original plate 10 is composed of a first electrode 11 and a plate layer 12 on which a letterpress, intaglio plate, or gravure plate pattern is formed, and the image receiving sheet 20 on which the electrostatic pattern is formed is composed of a second electrode 21 and an image receiving layer 22 which can be peeled from the second electrode 21.

Figure 2:
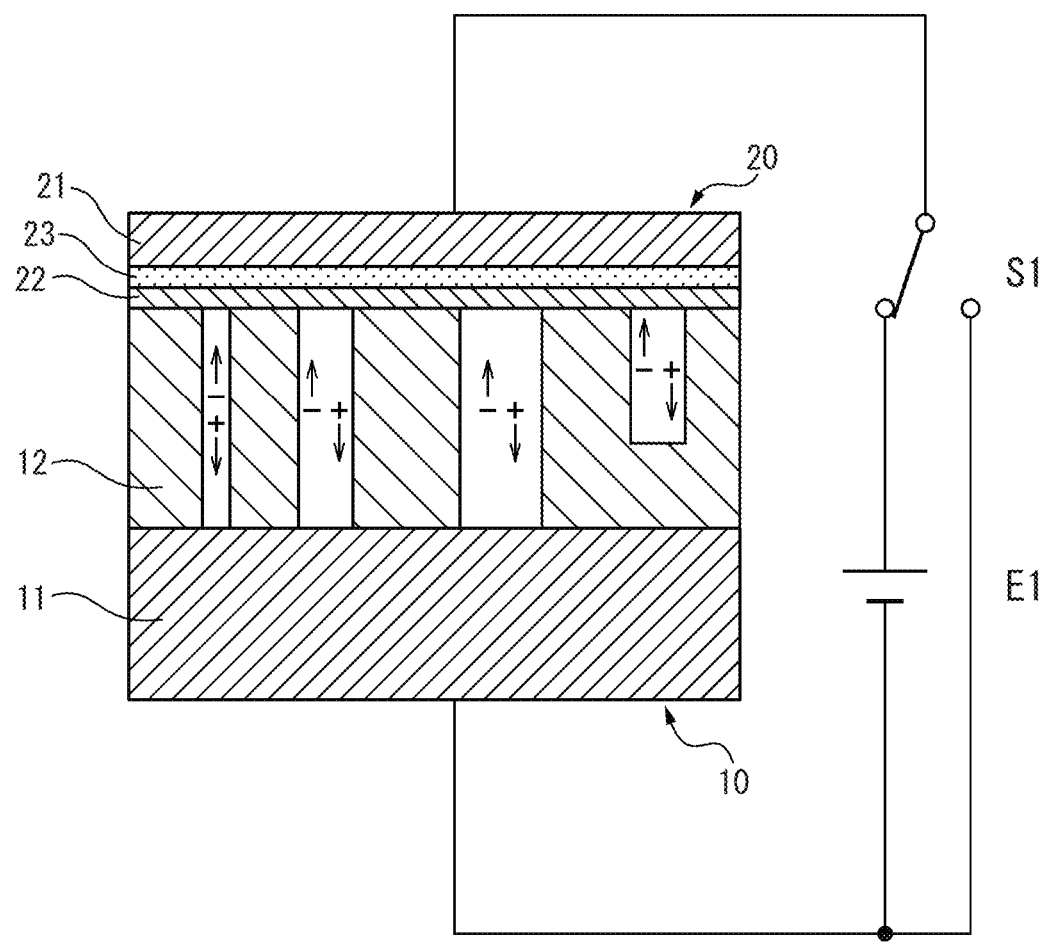
FIG. 2 is a view showing a step of adhering and applying voltage to an original plate and an image receiving sheet.

FIG. 2 is a structural diagram in which the plate layer 12 of the original plate 10 and the image receiving layer 22 of the image receiving sheet 20 are adhered so as to face each other, and shows a step in which a DC voltage is applied between the first electrode 11 of the original plate 10 and the second electrode 21 of the image receiving sheet 20 to discharge the air in the gaps 12a, 12b of the recesses of the plate layer 12, and discharged ions are adhered onto the image receiving layer 22 of the image receiving sheet 20.

Figure 3:
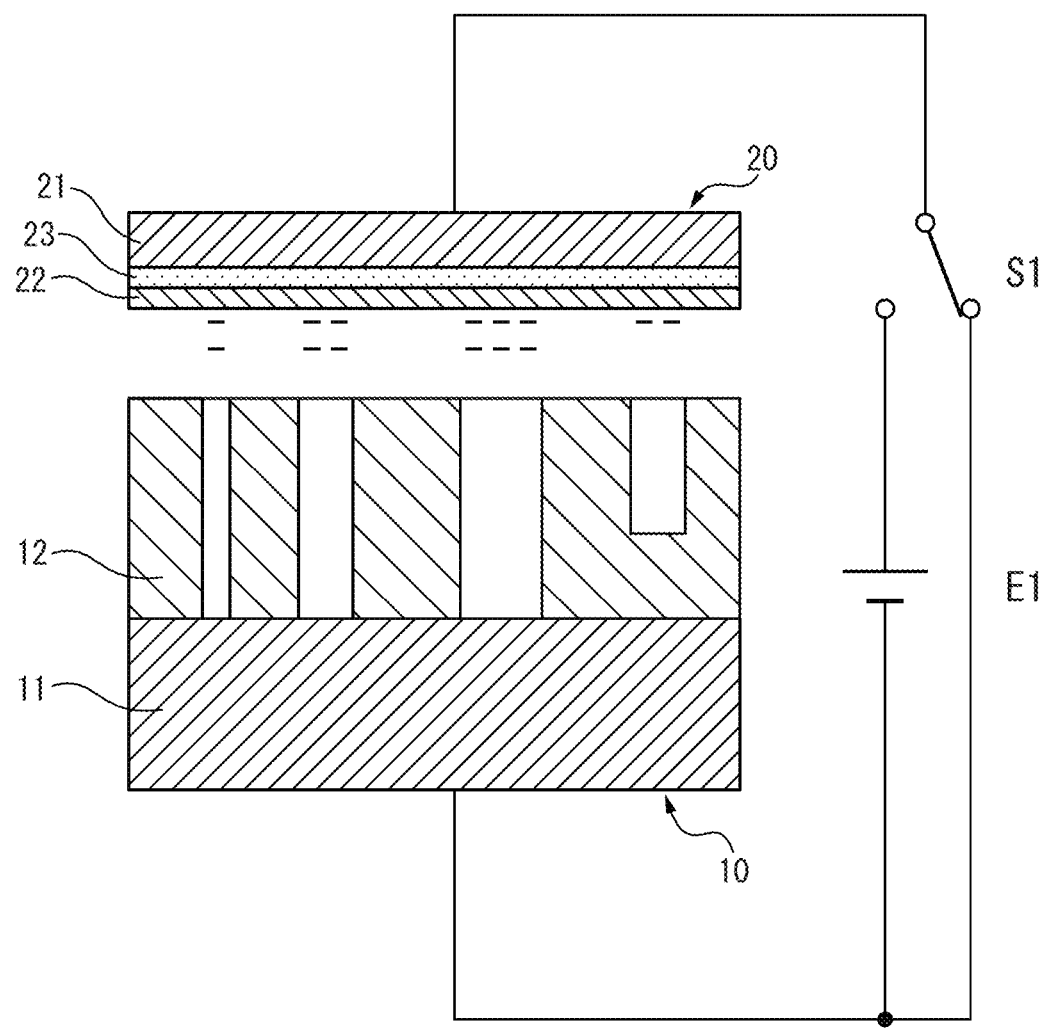
FIG. 3 is a view showing a step of peeling an image receiving sheet from an original plate.

FIG. 3 shows peeling of the image receiving sheet 20 from the original plate 10, and formation of an electrostatic pattern corresponding to the gaps 12a, 12b of the recesses of the plate layer 12 on the image receiving layer 22.

As shown in FIG. 1, the image receiving sheet 20 is composed of a second electrode 21 and an image receiving layer 22 which is laminated on the second electrode 21 and which can be peeled from the second electrode 21. In order to enable peeling of the image receiving layer 22 from the second electrode 21, the surface of the image receiving layer 22 in contact with the second electrode 21 or the surface of the second electrode 21 in contact with the image receiving layer 22 is subjected to adhesive processing. Examples of methods of adhesive processing include a method of providing an adhesive layer 23 between the image receiving layer 22 and the second electrode 21 by a lamination method, a coating method, etc. Examples of the material constituting the adhesive layer 23 include urethane-based adhesives, acrylic-based adhesives, and silicone-based adhesives.

The adhesive strength when peeling the image receiving layer 22 from the second electrode 21 is preferably 0.01 to 0.3 N/25 mm. If the adhesive strength is less than 0.01 N/25 mm, partly detaching may occur between the image receiving layer 22 and the second electrode 21 in the step of adhering and applying voltage to the original plate and the image receiving sheet, and the target electrostatic pattern may not be formed. Furthermore, when the adhesive strength exceeds 0.3 N/25 mm, it becomes difficult to peel the image receiving layer 22 from the second electrode 21, and there is a risk that the image receiving layer 22 may become torn or wrinkled when peeled.

Since it is necessary that the image receiving layer 22 retain static electricity, it must have high electrical insulation. A polyimide, polycarbonate, PET (polyethylene terephthalate), cycloolefin polymer, cycloolefin copolymer, or fluororesin film can be used as the image receiving layer 22. The thickness of the image receiving layer 22 is preferably 5 to 125 µm. If the thickness is less than 5 µm, handling after peeling from the second electrode 21 is difficult. Furthermore, if the thickness exceeds 125 µm, it is disadvantageous in terms of thickness reduction of the capacitive touch panel.

It is also necessary to consider the relative permittivity of the image receiving layer 22 and the applied voltage during the electrostatic pattern form depending on the purpose of use.

It is necessary that the second electrode 21 be conductive in order to fulfill the role of supplying an electric field. Examples of conductive materials include metals, conductive oxides, carbon, graphite, and conductive polymers, and it is necessary that the image receiving layer 22 be configured to so as to be peelable from the second electrode 21. There can be conceived a configuration in which the image receiving layer 22 is laminated on a conductive layer such as a metal foil, and the conductive layer is used as the second electrode 21. Alternatively, there may be adopted a configuration in which the image receiving layer 22 is laminated on the conductive layer of a sheet with a conductive layer in which the conductive layer such as a metal film, a conductive oxide film, or a conductive polymer film is provided in advance on a sheet of electrically insulating material, and the conductive layer is used as the second electrode 21.

The original plate 10 is composed of the first electrode 11 and the plate layer 12.

The first electrode 11 is not limited as long as it has conductivity necessary for discharging the gaps of the plate layer 12, and depending on the process speed of the system, there are no problems if the resistivity is $10^6$ Ωcm or less, and it is sufficient that the resistivity be $10^4$ Ωcm or less. The first electrode 11 may be made of any material as long as it is conductive, such as a metal, a conductive oxide, carbon, graphite, or a conductive polymer. Alternatively, it may be made of glass or plastic having on a surface thereof a metal film or a conductive oxide film formed by sputtering or a conductive polymer film formed by coating. Furthermore, there are no functional problems if a processing layer is provided on the surface of the first electrode 11 for the purpose of improving adhesion with the plate layer 12 and preventing the first electrode 11 itself from changing with time.

The material of the plate layer 12 may be a conductor, a semi-conductor, or an insulator. There are no problems even if the first electrode 11 and the plate layer 12 are integrated, when performing laser processing on a metallic copper to make a gravure plate or such as electroforming. When plate layer 12 is an insulator, generally, the surface of the substrate (here, the electrode 11) can be provided with a photoresist layer, exposed to ultraviolet rays through a pattern mask, and then developed, and the remaining photoresist layer can be used as the plate layer 12. Alternatively, the conductor or the semiconductor base material may be further engraved with a corrosive liquid, and this portion can be used as the plate layer 12.

The width and depth of engraving of the plate layer 12 are limited by the material of the plate layer and the processing method. The minimum depth is limited by the amount of discharged ions generated in the gaps. Though it appears that the limit is approximately 3 μm from current toner development capacity, this is not the case if a toner that can sufficiently develop even with a small amount of charge is developed in the future.

Figure 4:
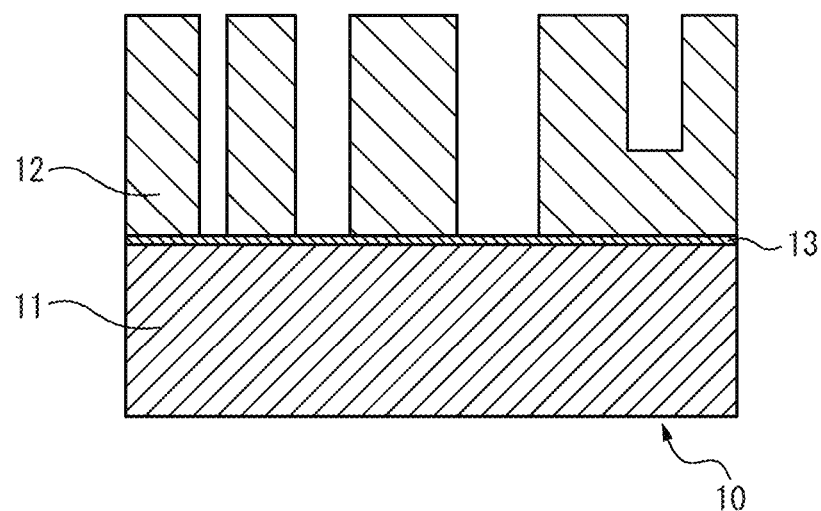
FIG. 4 is a view showing an original plate-electrode coating step.
Figure 5:
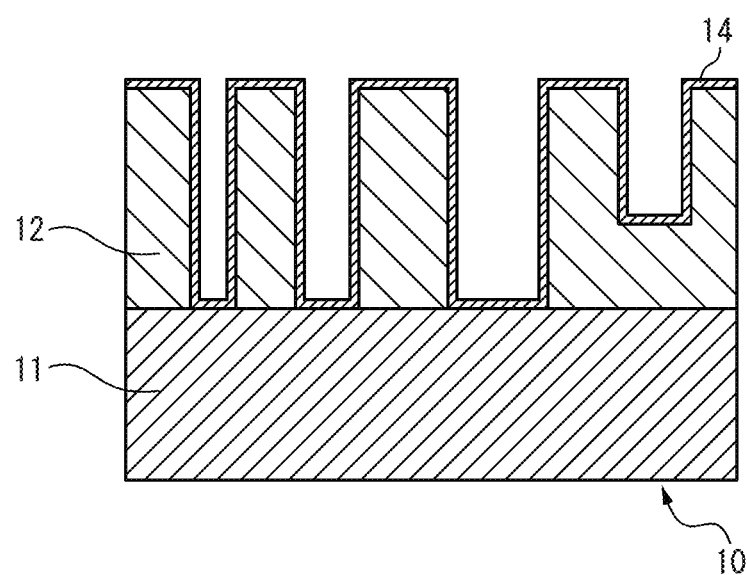
FIG. 5 is a view showing an entire original plate coating step.

In order to improve the durability of the original plate 10, it is effective to provide a coating film 13 on the surface of the first electrode 11 as shown in FIG. 4 or to provide a coating film 14 on the entire original plate as shown in FIG. 5.

Since the electrostatic pattern is formed by the discharged ions of the gaps between the original plate 10 and the image receiving sheet 20, basically, the recesses of the plate layer are configured as the target pattern. However, since the electrostatic pattern becomes apparent by developing with charged particles called toner, the so-called negative-positive development of electrophotographic technology can be performed and toner can be adhered to the portions corresponding to the protrusions of the plate layer, whereby the protrusions can be used as the target pattern. In addition, the discharged ions amount of the gaps is determined by the depths of the gaps with respect to the same applied voltage, and the shallower the depth, the smaller the discharged ions, and as a result, the toner adhesion amount is also limited, whereby printing with the same effect as conventional gravure printing can be achieved.

Figure 6:
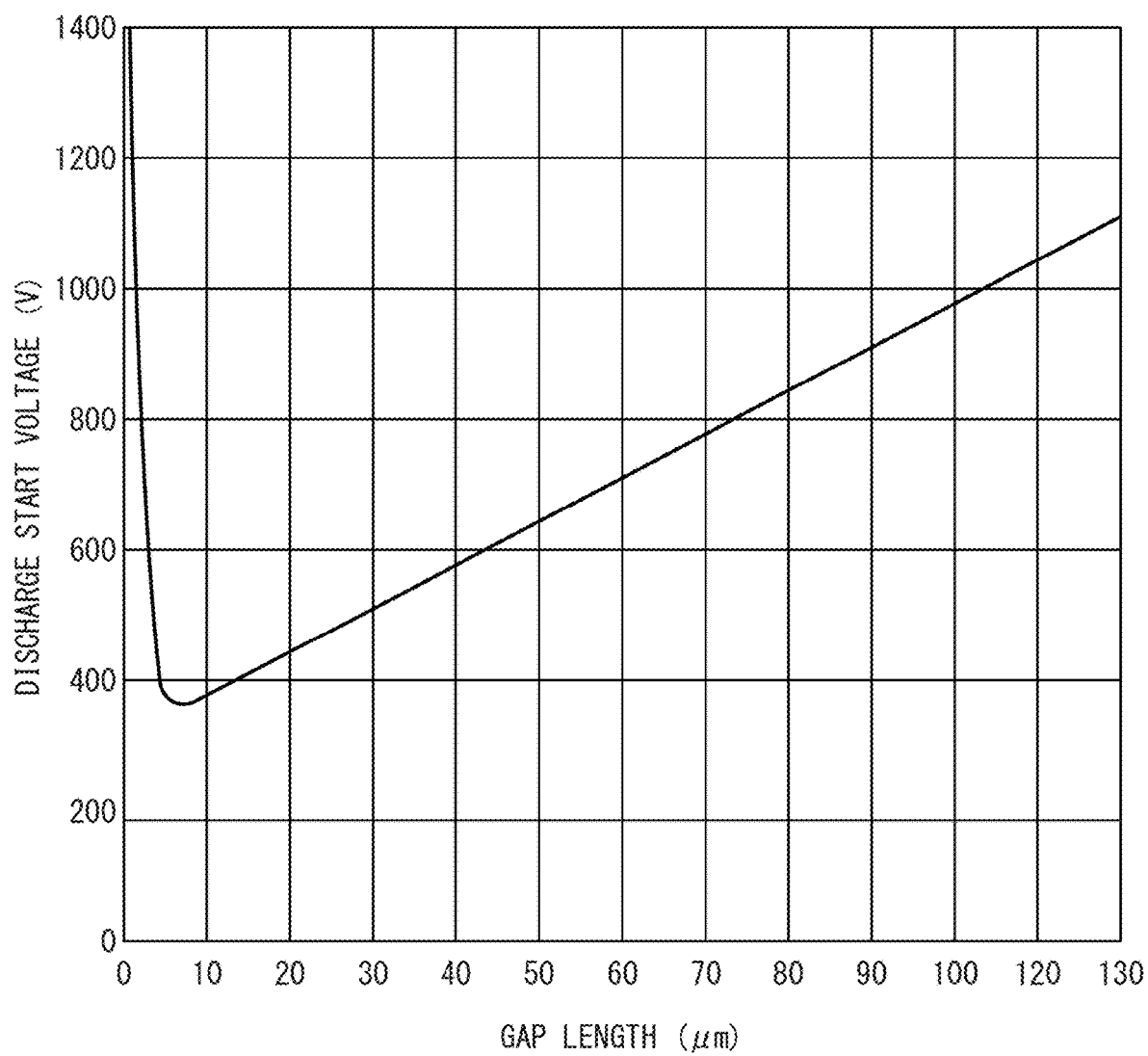
FIG. 6 is a Paschen curve.

The situation where the gap are discharged can be roughly calculated from Paschen's Law. FIG. 6 shows a drawing of the Paschen curve of atmospheric pressure air, where the horizontal axis is gap length and the vertical axis is discharge start voltage. When gap length is approximately 5 μm, discharge start voltage is minimum value. When gap length is 8 μm or more, the Paschen curve becomes almost linear, and is approximated by the following formula, where gap length: d (μm) and discharge start voltage: Vb (V).

$$Vb = 312 + 6.2d \quad (1)$$

If gap length is 20 μm, discharge start voltage is 436 V. Specifically, when an external voltage of 436 V or higher is applied to the gap, a discharge occurs and ions are generated. Concerning generated ions, according to the electric field, the positive ions move toward the negative electrode and the negative ions move toward the positive electrode. The image receiving layer 22 is charged by the ions and acts in the direction of weakening the electric field of the gap. The discharge ends when the voltage applied to the gap reaches discharge start voltage of 436 V.

An example of an intaglio plate will be described. In FIG. 2, the image receiving layer 22 is composed of PET having a thickness of 25 μm, and the adhesive layer 23 is an acrylic adhesive having a thickness of 20 μm. The original plate 10 is an intaglio plate, and the thickness of the plate layer 12 and the depth of the gap 12a of the recess are 20 μm. It is assumed that the first electrode 11 of the original plate 10 is the ground potential and a voltage of +1250 V is applied to the second electrode 21 of the image receiving sheet 20. The relative permittivity of PET is about 3.3 and the relative permittivity of acrylic adhesive is about 3.3, and when converted to air thickness, correspond to approximately 7.6 μm and approximately 6.1 μm, respectively, whereby the voltage applied to a 20 μm gap is 1250×20÷(20+7.6+6.1) V=742 V. Since this value is greater than discharge start voltage of a 20 μm gap obtained from formula (1), 436 V, discharge ions are generated in the gap, negative ions move toward the second electrode 21 and are charged in the image receiving layer 22, and positive ions flow to the first electrode 11. When the image receiving layer 22 is charged to −(742−436)=−306 V, the electric field applied to the gap reaches discharge start voltage of 436 V, whereby the discharge stops. Thereafter, when the applied power is turned off, the second electrode 21 of the image receiving sheet 20 is set to 0 V, and then the image receiving sheet 20 is peeled from the original plate 10, an electrostatic pattern is formed on the image receiving layer 22 in which the portions corresponding to the gaps of the intaglio plate are charged to −306 V. The reason why the electrode 21 is set to 0 V before peeling is to give a condition wherein separating discharge does not occur in any part of the entire surface. The electrostatic pattern on the image receiving layer 22 becomes a visible pattern by developing with charged particles. When the charged particles are particles which can be plated, a high-definition electrode circuit pattern is formed on the image receiving layer 22 by performing a plating process after developing with the charged particles. The image receiving layer 22 on which the high-definition electrode circuit pattern is formed is peeled from the second electrode 21, and is used as a capacitive touch panel.

An original plate was actually produced as follows. The first electrode 11 was formed by sputtering of an ITO film onto a floating glass plate having a thickness of 2 mm. Next, the original plate was prepared by providing a photoresist layer on the first electrode 11, overlaying a mask having a touch panel electrode circuit pattern (wiring electrode part L/S=100/100, mesh electrode part line width=5 μm) thereon, and performing UV exposure and subsequently developing to form a plate layer (intaglio plate) 12 made of a photoresist. An image receiving sheet was produced as follows. An electrode 21 was formed by sputtering of an ITO film on a PET film having a thickness of 125 μm. Next, an adhesive layer 23 having a thickness of 20 μm was applied onto the second electrode 21. Subsequently, a PET film having a thickness of 25 μm as an image receiving layer 22 was laminated onto the adhesive layer 23 to prepare an image receiving sheet in which the image receiving layer 22 could be peeled from the second electrode 21. In a state in which the electrodes of the original plate and the image receiving sheet were at 0 V, the plate layer of the original plate and the image receiving layer of image receiving sheet were aligned and adhered with the suction adhesion device, and the same 1250 V as described above was applied between the first electrode 11 of the original plate and the second electrode 21 of the image receiving sheet, and then returned to 0 V and peeled. The electrostatic image pattern on the image receiving layer 22 was then developed with charged particles which are capable of being plated, and electroless copper plating was then performed. An accurate image reproduction of the copper electrode circuit pattern for a touch panel (wiring electrode part L/S=100/100, mesh electrode part line width 5 μm) was obtained on the image receiving layer 22.

Furthermore, an image output experiment identical to that described above was performed using an all-nickel original plate prepared by electroforming, and the image of the recesses was accurately developed, and it was confirmed that there was no pattern on parts other than the recessed image, i.e., no traces of fog, and there was no charge in the portions where the metal was adhered to the image receiving sheet.

An example of a letterpress will be described. The same process was performed under the same conditions as the intaglio plate example above, and an electrostatic pattern in which the portions corresponding to the gaps of the letterpress were charged to −306 V was formed. In the next step, developing with the positive toner used in electrophotographic technology was performed to produce a negative visible image.

An example of a gravure plate will be described. As in the case of the intaglio plate described above, the thickness of the entire plate and the depth of gap 12a were also 20 μm, and the depth of gap 12b in the shallow part of the engraving corresponding to a halftone in the image was 10 μm, and when the material of the plate layer is a conductor or a semiconductor, the gap is calculated as 10 μm by the same calculation method as for the intaglio plate described above, and discharge start voltage is 374 V, the voltage applied to the gap is 527 V, and the image receiving layer 22 has an electrostatic pattern of −153 V. By making a difference in the depth of engraving on the same plate in this manner, it is possible to express halftones.

When the material of the plate layer is an insulator, the amount of charge on the image receiving layer 22 is different because the bottom surface in which the recesses are carved is charged. Since the depth of the gap 12b is the same, discharge start voltage is also 374 V, but since the voltage applied to the gap 12b changes by adding bottom part of 10 μm in the plate layer, if the relative permittivity of the plate layer is also the same 3.3, the voltage applied to the gap 12b will be 1250×10/(10+7.6+6.1+3)=468 V. When the image receiving layer 22 is charged to −(468−374)=−94V, the electric field applied to the gap 12b reaches discharge start voltage of 374V, whereby the discharge is stopped. Since the amount of positive and negative ions generated by the discharge is the same, the negative ions are charged in the image receiving layer 22, and the positive ions are charged in the carved bottom surface of the recesses of the plate layer, the generated voltage is the ratio of the capacitance of each insulator (i.e., the ratio of the thickness in terms of air), the image receiving layer 22 is charged with −77 V, and the plate layer 12 at the bottom of the gap 12b is charged with +17 V. The charge on the plate layer 12 may be removed by an AC corona discharger or the like before subsequent printing. Since the amount of toner adhered changes depending on the amount of charge in the image receiving layer, the charge value differs even if the engraving depth is the same due to the difference in the material of the plate layer of the gravure plate as described above, but the same gravure plate printing effect as that of the conventional printing can be obtained.

Pre-charge processing can be performed on the image receiving sheet prior to adhesion with the original plate, and two effects can be obtained. First, there is a possibility that uniform adherence can be obtained and the mechanical pressure-bonding force from behind can be eliminated. However, the charge value must be a value at which the gap does not discharge until the image receiving sheet is brought closer to the original plate and adhered. For example, when the thickness of the plate layer 12 and the depth of the gap of the recesses of the original plate described above is 20 μm, the charge value should be less than discharge start voltage of 436 V of an air layer of 20 μm. This value is sufficient for adherence to the image receiving sheet.

The second is that the electric field at the developing stage becomes large and developing efficiency improves. Since the adherence effect of pre-charging is the same regardless of polarity, it is important to charge with the same polarity as the polarity applied to the electrode 21 of the image receiving sheet during electrostatic pattern formation. Assuming the case of the intaglio plate described above, since +1250 V is applied to the electrode 21 of the image receiving sheet, the pre-charge processing on the image receiving sheet charges to approximately +350 V with a margin to prevent discharge. Since the electrostatic pattern to be formed has the same charge of −306 V regardless of pre-charging, as a result, the signal of 656 V is developed, and the developing effect of more than double is obtained. Since this effect is large, it is worth performing even when the pre-charge value is low and the adherence effect is small by limitation by discharge start voltage.

When the image receiving layer 22 is used for a capacitive touch panel after peeling from the second electrode 21, it is necessary that the image receiving layer 22 be transparent, but the second electrode 21 and the adhesive layer 23 need not necessarily be transparent. When the image receiving layer 22 is thin, by adopting a configuration wherein the image receiving layer 22 is laminated on the conductive layer of the sheet with conductive layer and the conductive layer is used as the second electrode 21, it is possible to impart rigidity to the entire image receiving sheet to improve handleability.

It is necessary that the original plate 10 and the image receiving sheet 20 be adhered for electrostatic pattern formation.

When the original plate 10 has a flat plate-like shape, the electrostatic pattern may be formed by a mechanism such as pressure-bonding the original plate 10 and the image receiving sheet 20, applying a voltage between the first electrode 11 and the electrode 21, and peeling the image receiving sheet 20 from the original plate 10. At that time, a sheet-fed image receiving sheet 20 may be sequentially transported to a position facing the original plate 10, or the location where the electrostatic pattern should be formed of the image receiving sheet 20 drawn from a roll-like shape and expanded into a strip shape may be sequentially conveyed to a position facing the original plate 10, and the operation described above may be performed.

When the original plate 10 is in the shape of a drum and the image receiving sheet is in the shape of a roll, the image receiving sheet 20 may be continuously conveyed onto the original plate 10 by a roll-to-roll method, and the operation described above may be performed.

<Second Invention>

In order to facilitate understanding, the structure of the second invention and electrostatic pattern formation process will be described with reference to the basic conceptual diagrams shown in FIGS. 7 to 12.

Figure 7:
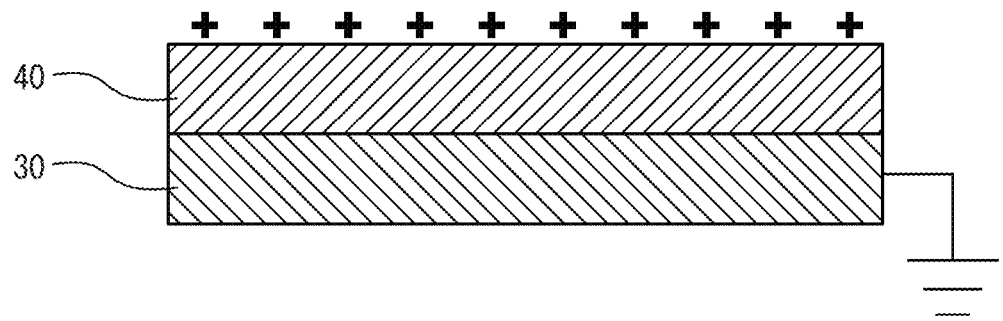
FIG. 7 is a view showing a step in which an image receiving sheet and a back surface electrode are adhered and pre-charge processing is performed on a pattern formation surface of the image receiving sheet.

FIG. 7 shows a state in which a back surface electrode 30 is adhered on the surface opposite to the pattern formation surface of the image receiving sheet 40, and the back surface electrode 30 is grounded. Prior to adherence of a mask sheet a50 on the pattern formation surface of an image receiving sheet 40, pre-charge processing is performed on the image receiving sheet 40 with a charge having the opposite polarity to the charge for forming the electrostatic pattern (+300 V in this example). This pre-charge processing ensures that the mask sheet a50 adheres to the image receiving sheet 40.

Figure 8:
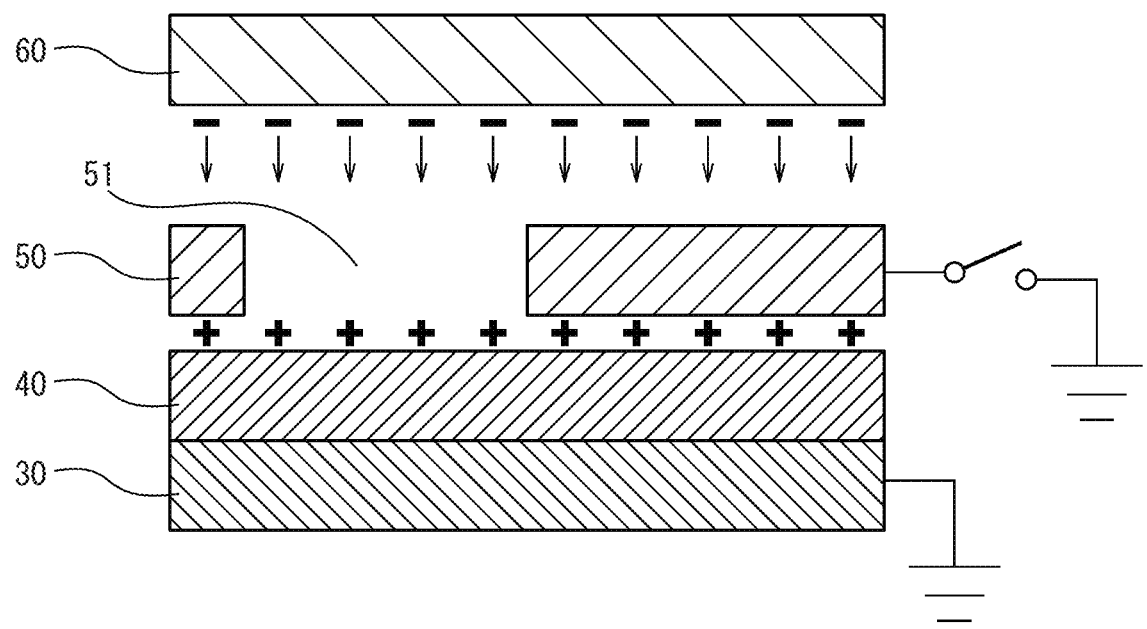
FIG. 8 is a view showing a step in which an image receiving sheet and a mask sheet are adhered and ion irradiation is performed through the mask sheet.

FIG. 8 shows a state in which ion irradiation means 60 is used to perform ion irradiation through the mask sheet a50 in a state where the mask sheet a50 comprising an ion-permeable opening 51 is adhered on the pattern formation surface of the image receiving sheet 40. After ion irradiation, the surface of the mask sheet a50 and the portion of the pattern formation surface of the image receiving sheet 40 corresponding to the ion-permeable opening 51 are charged (−300 V in this example).

Figure 9:
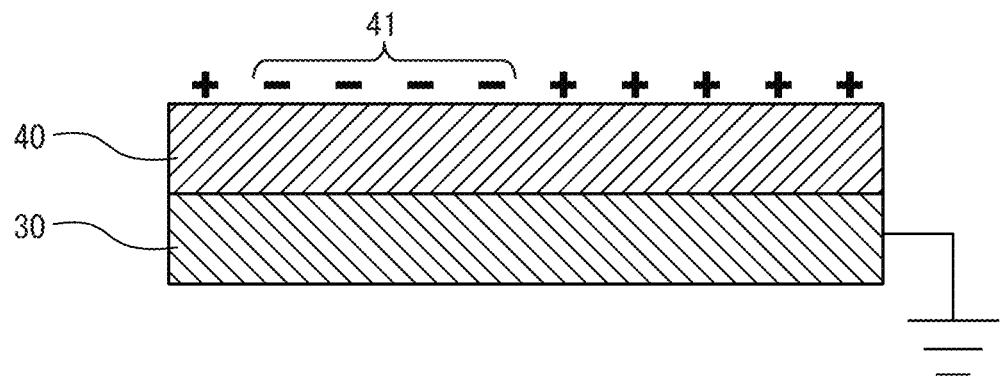
FIG. 9 is a view showing a step of peeling a mask sheet from an image receiving sheet to form an electrostatic pattern.

FIG. 9 shows the state after peeling a mask sheet a50 from the image receiving sheet 40 in a state in which the mask sheet a50 is grounded. Electrostatic pattern A41 is formed on the pattern formation surface of the image receiving sheet 40. The charge in the portion shielded by the mask sheet a50 during ion irradiation does not change (+300 V in this example).

Figure 10:
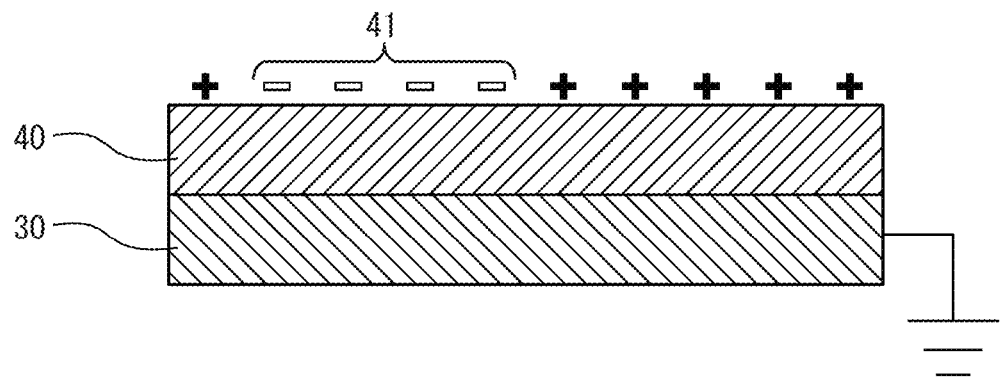
FIG. 10 is a view showing a step of adhering an image receiving sheet and a back surface electrode on which an electrostatic pattern A is formed in advance.

FIG. 10 shows a state in which the back surface electrode 30 is adhered onto the surface opposite to the pattern formation surface of the image receiving sheet 40, and the back surface electrode 30 is grounded. Electrostatic pattern A41 (−300 V in this example) is formed in advance on the pattern formation surface of the image receiving sheet 40, and the other portions are charged with a charge having the opposite polarity to the electrostatic pattern A41 (+300 V in this example).

Figure 11:
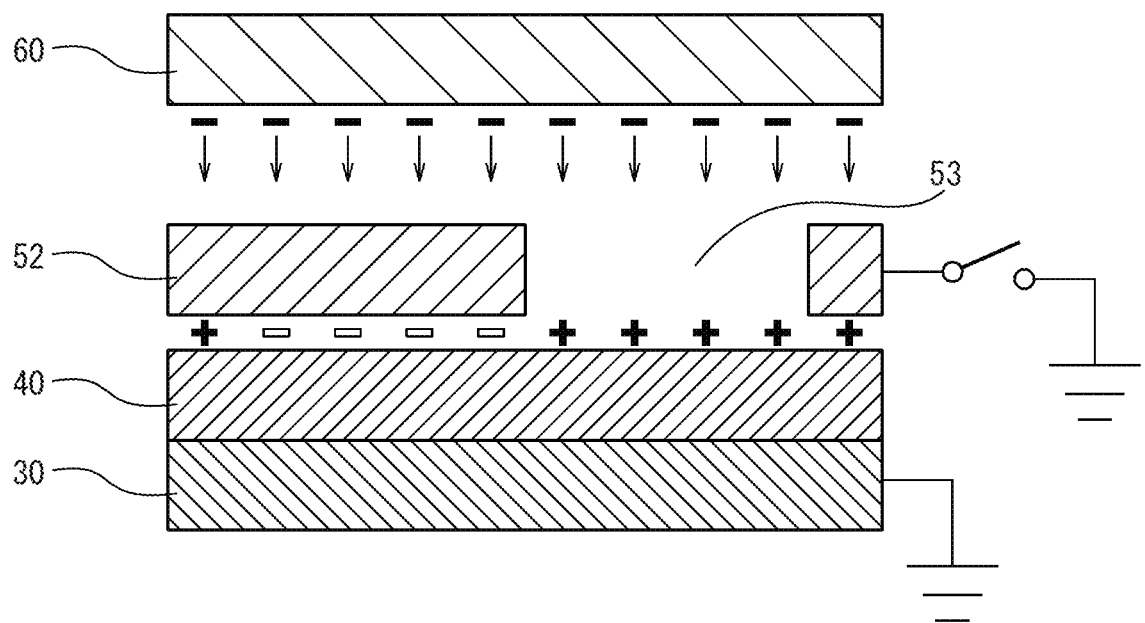
FIG. 11 is a view showing a step in which an image receiving sheet and a mask sheet are adhered and ion irradiation is performed through the mask sheet.

FIG. 11 shows a state in which ion irradiation means 60 is used to perform ion irradiation through the mask sheet b52 in a state where a mask sheet b52 provided with an ion-permeable opening 53 is adhered on the pattern formation surface of the image receiving sheet 40. After ion irradiation, the surface of the mask sheet b52 and the portion of the pattern formation surface of the image receiving sheet 40 corresponding to the ion-permeable opening 53 are charged (−300 V in this example).

Figure 12:
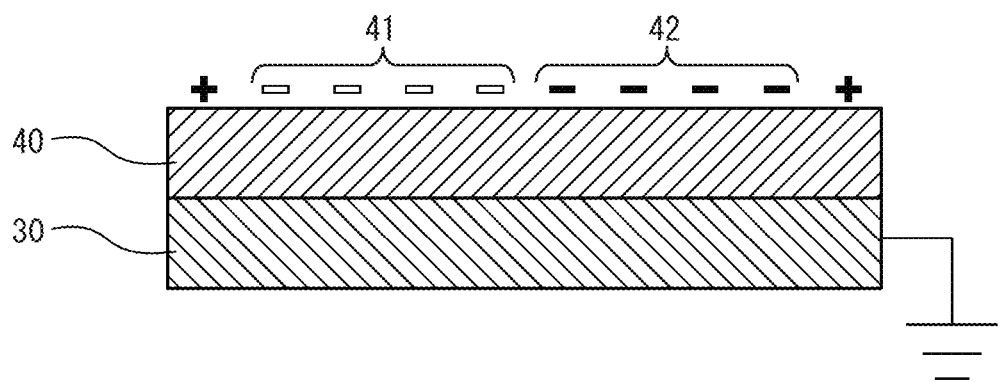
FIG. 12 is a view showing a step of peeling a mask sheet from an image receiving sheet to form an electrostatic pattern B adjacent to the electrostatic pattern A.

FIG. 12 shows the state after peeling a mask sheet b52 from the image receiving sheet 40 in a state in which the mask sheet b52 is grounded. An electrostatic pattern B42 is formed adjacent to the electrostatic pattern A41 on the pattern formation surface of the image receiving sheet 40. The charge in the portion shielded by the mask sheet b52 during ion irradiation does not change.

Since it is necessary that the image receiving sheet 40 retain static electricity, at least the pattern formation surface is composed of a material having high electrical insulation, and can be formed from the same material as the image receiving layer of the first invention. Specifically, a film or sheet of polyimide, polycarbonate, PET (polyethylene terephthalate), cycloolefin polymer, cycloolefin copolymer, fluororesin or the like can be used as the image receiving sheet 40. The thickness of the image receiving sheet 40 is preferably 5 to 500 μm. If the thickness is less than 5 μm, handling is difficult. On the other hand, if the thickness exceeds 500 μm, it is disadvantageous in terms of flexibility and thickness reduction. It is also necessary to consider the relative permittivity of the image receiving sheet 40 depending on the purpose of use.

Since the back surface electrode 30 may play a role of stabilizing the electric charge charged on the pattern formation surface of the image receiving sheet 40, any material may be used as long as it is a conductive material. Examples of the conductive material include metals, conductive oxides, conductive polymers, carbon, graphite, and the like.

The back surface electrode 30 is arranged on the opposite surface of the pattern formation surface of the image receiving sheet 40. Though the back surface electrode 30 can serve the role described above as long as it is pressure-bonded to the image receiving sheet 40, if it is integrated with the image receiving sheet 40, it can be easily handled in the pre-charge processing step, the ion irradiation step, and the developing step. If the conductive layer is formed on the opposite surface of the pattern formation surface of the image receiving sheet 40 by sputtering of a metal film, a conductive oxide film, etc., coating a conductive polymer film, laminating a metal foil, etc., since the conductive layer can be used as the back surface electrode, the image receiving sheet 40 and the back surface electrode 30 can be integrated. Alternatively, since the sheet with a conductive layer in which a conductive layer such as a metal film, a conductive oxide film, or a conductive polymer film is provided in advance on a sheet of electrically insulating material is laminated on the opposite surface of the pattern formation surface of the image receiving sheet 40, the conductive layer can be used as the back surface electrode 30, whereby the image receiving sheet 40 and the back surface electrode 30 can be integrated.

In the case of integrating the image receiving sheet 40 and the back surface electrode 30 by laminating a sheet with conductive layer, metal leaf, etc., on the opposite surface of the pattern formation surface of the image receiving sheet 40, by adjusting the adhesive strength of the adhesive layer used when laminating, when the image receiving sheet 40 is used, the image receiving sheet 40 can be peeled from the back surface electrode 30, whereby it is possible to meet the demand for thickness reduction and the demand for a structure without the conductive layer. In this case, the adhesive strength when peeling the image receiving sheet 40 from the back surface electrode 30 is preferably 0.01 to 0.3 N/25 mm. If the adhesive strength is less than 0.01 N/25 mm, partly detaching may occur between the image receiving sheet and the back surface electrode in the pre-charge processing step, the ion irradiation step, and the developing step, and there is a risk that the target electrostatic pattern may not be formed. If the adhesive strength exceeds 0.3 N/25 mm, it becomes difficult to peel the image receiving sheet 40 from the back surface electrode 30, and there is a risk that the image receiving sheet 40 may become torn or wrinkled when peeled.

When the mask sheet a50 is irradiated with ions, it is necessary to allow ions to permeate only the ion-permeable opening 51 and block ions other than those passing through the ion-permeable opening. Thus, excluding the ion-permeable opening, at least the entire surface must be conductive. The entire mask sheet need not necessarily be conductive. Thus, the mask sheet a50 may be a molded body containing only a conductive material or a laminated body composed of a conductive material and an insulating material, and may have the predetermined ion-permeable opening 51. The same characteristics are required for mask sheet b52.

The mask sheet a50 can be produced by providing an ion-permeable opening 51 in the sheet with conductive layer in which a conductive layer such as a metal film is provided on a sheet composed of a conductive material such as a metal foil or a metal plate, or a sheet of electrically insulating material, by etching processing, laser processing, or a method combining these. Mask sheet b52 can be produced in the same way.

The ion irradiation means 60 is not particularly limited. An ion irradiation method using corona discharge is preferable because processing can be performed in the atmosphere, the polarity of the irradiated ions can easily be switched, and it can be used in both the pre-charge processing step and the ion irradiation step.

The electrostatic printing method of the second invention may be carried out alone or in combination with other printing methods. For example, an electrostatic pattern A can be first formed by the above electrostatic printing method, and an electrostatic pattern B can then be formed adjacent to the electrostatic pattern A or partially superimposed on the electrostatic pattern A using the same printing method. Further, first, an electrostatic pattern C can be formed by a high-definition electrostatic printing method (refer to Patent Literature 3), and the electrostatic pattern A can then be formed adjacent to the electrostatic pattern C or partially superimposed on the electrostatic pattern C by the electrostatic printing method of the second invention. Alternatively, first, a visible pattern C can be formed by developing the electrostatic pattern C after formation by the high-definition electrostatic printing method described above, and the electrostatic pattern A can then be formed adjacent to the visible pattern C or partially superimposed on the visible pattern C by the electrostatic printing method of the second invention. Furthermore, an electrode circuit pattern D can be formed by another printing method, and the electrostatic pattern A can then be formed adjacent to the electrode circuit pattern D or partially superimposed on the electrode circuit pattern D by the electrostatic printing method of the second invention. The electrostatic printing method of the second invention is not only suitable for high-mix low-volume production, but also can easily respond to individual requests such as addition and modification of electrostatic patterns.

<Third Invention>

In order to facilitate understanding, the structure of the third invention and the electrostatic pattern formation process will be described with reference to the basic conceptual diagrams shown in FIGS. 13 to 21.

Figure 13:
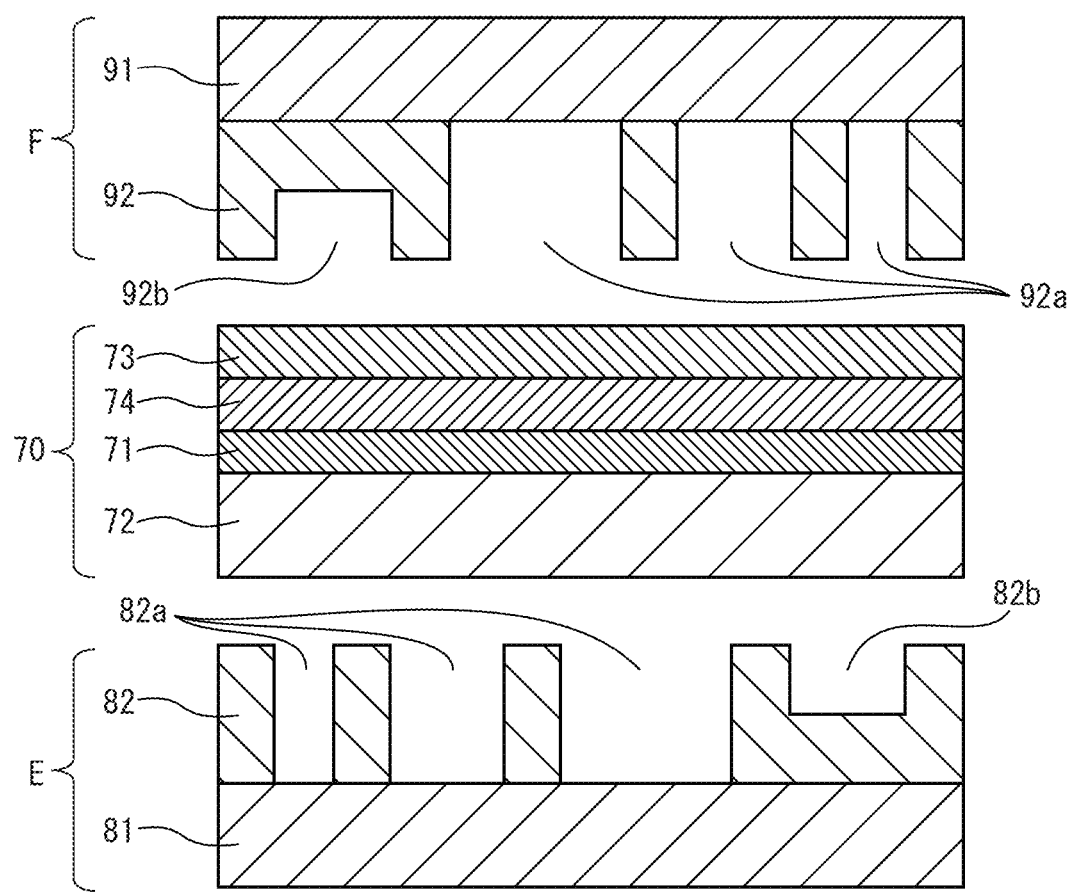
FIG. 13 is a view showing a step of arranging original plates on both sides of an image receiving sheet.
Figure 14:
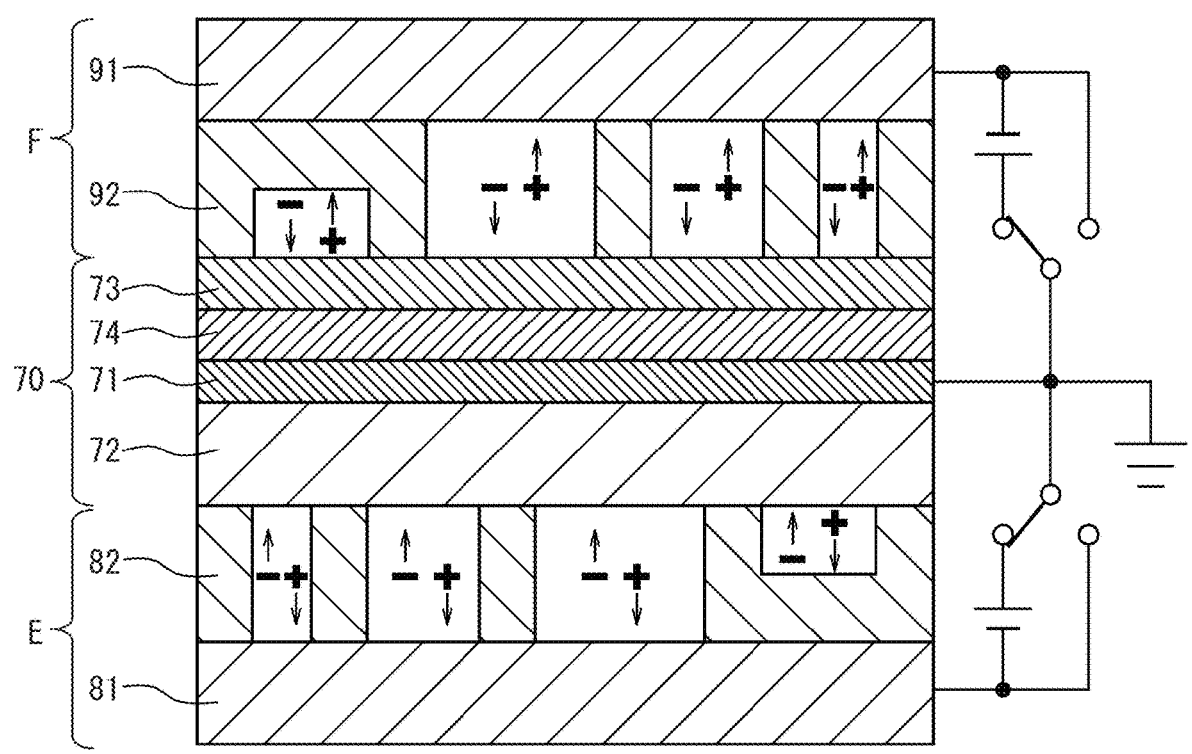
FIG. 14 is a view showing a step in which original plates are arranged on both sides of an image receiving sheet and a voltage is applied.
Figure 15:
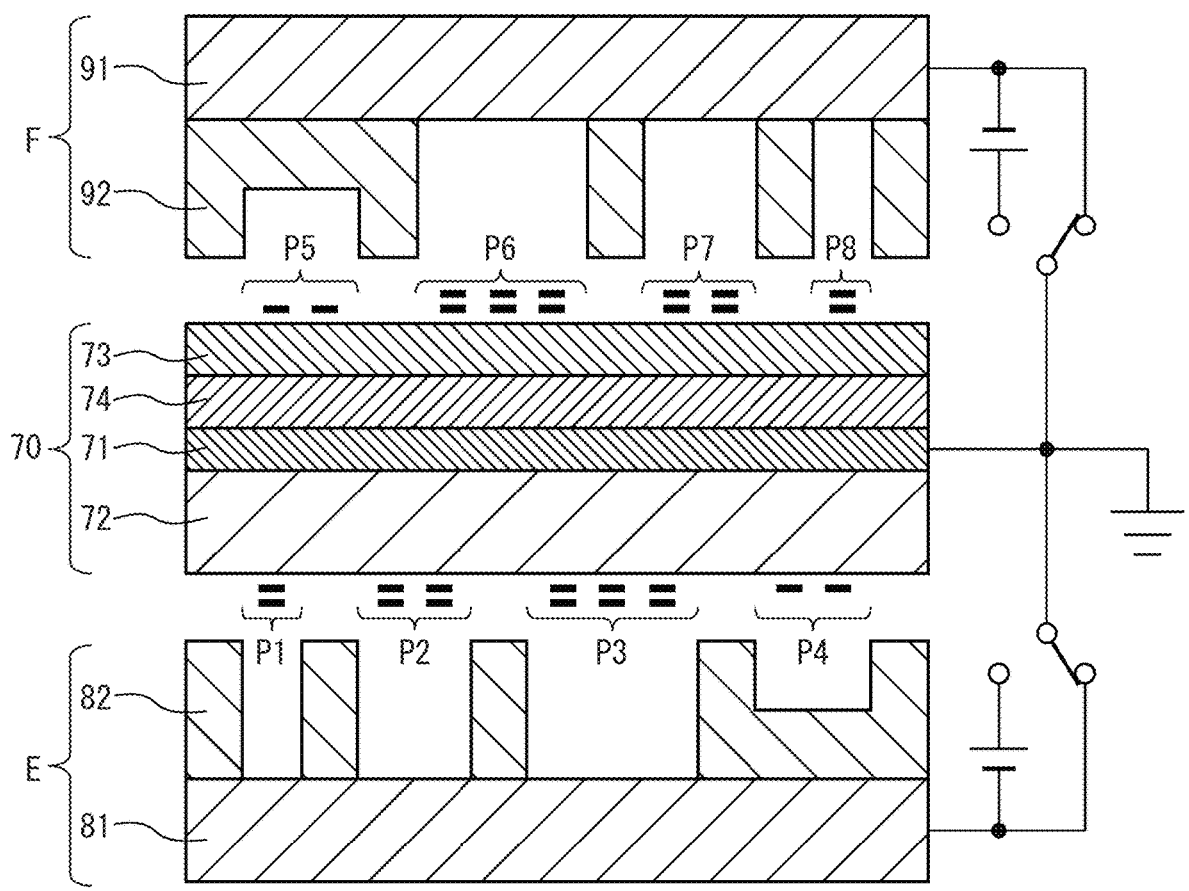
FIG. 15 is a view showing a step of peeling an image receiving sheet from an original plate to form an electrostatic pattern.

FIGS. 13 to 15 show a structure in which original plates are arranged on both sides of an image receiving sheet and an electrostatic pattern formation process according to a first aspect of the third invention.

FIG. 13 shows the structures of each of original plate E, original plate F, and an image receiving sheet 70. Original plate E is composed of an electrode 81 and a letterpress, intaglio plate, or gravure plate-like plate layer 82, and original plate F is composed of an electrode 91 and a letterpress, intaglio plate, or gravure plate-like plate layer 92. The image receiving sheet 70 is composed of an electrode 71 and an image receiving layer 72 and image receiving layers 73 laminated on both sides of the electrode 71. The image receiving layer 72, electrode 71, and image receiving layers 73 are integrated by providing an intermediate layer 74 between the electrode 71 and the image receiving layer 72, or between the electrode 71 and the image receiving layer 73, if necessary. The original plate E and the original plate F are arranged so as to provide a gap so that the plate layers face each other, and the image receiving sheet 70 is arranged between the original plate E and the original plate F.

FIG. 14 shows a state in which a voltage is applied in a state in which the original plate E and the original plate F are adhered on both sides of the image receiving sheet. Specifically, first, the plate layer 82 of the original plate E and the image receiving layer 72 of the image receiving sheet 70 are adhered, and the plate layer 92 of the original plate F and the image receiving layer 73 of the image receiving sheet 70 are adhered. Next, the electrode 71 of the image receiving sheet 70 is set to the ground potential, and a DC voltage is applied between the electrode 81 of the original plate E and the electrode 71 of the image receiving sheet 70, and between the electrode 91 of the original plate F and the electrode 71 of the image receiving sheet 70, the air in the gap 82a and gap 82b of the recesses of the plate layer 82 is discharged, and the air in the gap 92a and gap 92b of the recesses of the plate layer 92 is discharged, where discharged ions are attached on the image receiving layer 72 and the image receiving layer 73.

FIG. 15 shows the formation of electrostatic patterns P1 to P4 corresponding to the recessed gap 82a and gap 82b of the plate layer 82 on the image receiving layer 72, and electrostatic patterns P5 to P8 corresponding to the recessed gap 92b and gap 92a of the plate layer 92 on the image receiving layer 73 by peeling the image receiving sheet 70 from the original plate E and the original plate F after grounding the electrode 81 of the original plate E and the electrode 91 of original plate F.

The electrode 71 has the same configuration as the second electrode 21 of the first invention, and it is necessary that it be conductive to serve a role of supplying an electric field. Examples of the conductive material include metals, conductive oxides, carbon, graphite, and conductive polymers. The conductive material is appropriately selected depending on whether transparency is required in the usage pattern of the image receiving sheet. For applications that require transparency, there can be considered a configuration wherein first, a transparent conductive layer such as a conductive oxide film or a conductive polymer film is provided as the electrode 71 on the image receiving layer 72, and next, the image receiving layer 73 is laminated on the transparent conductive layer using an intermediate layer 74 (adhesive layer, glue layer, etc.). Conversely, in applications where transparency is not required, there can be considered a configuration wherein the intermediate layer 74 (adhesive layer, glue layer, etc.) is used on both sides of the electrode 71 such as a metal foil, and the image receiving layer 72 and the image receiving layer 73 are laminated thereon. Alternatively, there can be considered a configuration wherein a metal film or the like is first provided on the image receiving layer 72 as the electrode 71, and the image receiving layer 73 is then laminated on the metal film or the like using an intermediate layer 74 (adhesive layer, glue layer, etc.).

The image receiving layer 72 and the image receiving layer 73 have the same configuration as the image receiving layer 22 of the first invention, and it is necessary that they have high electrical insulation because they need to retain static electricity. Polyimide, polycarbonate, PET (polyethylene terephthalate), cycloolefin polymer, cycloolefin copolymer, and fluororesin films can be used as the image receiving layer 72 and the image receiving layer 73. The image receiving layer 72 and the image receiving layer 73 need not necessarily be the same material and have the same thickness. The thicknesses of the image receiving layer 72 and the image receiving layer 73 are preferably 5 to 125 μm. If the thicknesses are less than 5 μm, handling is difficult. Further, if the thicknesses exceed 125 μm, it is disadvantageous in terms of thickness reduction of electronic components, etc. Furthermore, it is necessary to consider the relative permittivity of the image receiving layer 72 and the image receiving layer 73 and the applied voltage at the time of electrostatic pattern formation depending on the purpose of use.

The original plate E is composed of an electrode 81 and a plate layer 82, and the original plate F is composed of an electrode 91 and a plate layer 92. The electrode 81 and electrode 91, as well as the plate layer 82 and plate layer 92 need not necessarily be the same material and the same thickness. The electrode 81 and the electrode 91 have the same configuration as the first electrode 11 of the first invention, and the plate layer 82 and the plate layer 92 have the same configuration as the plate layer 12 of the first invention.

An example of an intaglio plate in which the target pattern is the recesses of the plate will be described. In FIG. 13, the image receiving layer 72 is PET having a thickness of 50 μm, the image receiving layer 73 is PET having a thickness of 25 μm, and the intermediate layer 74 is an acrylic adhesive having a thickness of 25 μm.

Original plate E (and original plate F) is an intaglio plate, and the thickness of the plate layer 82 and the depth of the gap 82a of the recess (and the thickness of the plate layer 92 and the depth of the gap 92a of the recess) are 20 μm. It is assumed that the electrode 71 of the image receiving sheet 70 is set to the ground potential and a voltage is applied so that −1300 V is applied to the electrode 81 of the original plate E (and the electrode 91 of the original plate F). The relative permittivity of PET is approximately 3.3, and the relative permittivity of the acrylic adhesive is approximately 3.3. Since PET with a thickness of 50 μm, PET with a thickness of 25 μm, and an acrylic adhesive with a thickness of 25 μm are equivalent to approximately 15.2 μm, approximately 7.6 μm, and approximately 7.6 μm, respectively, in terms of air thickness, the voltage applied to the gap 82a and the gap 92a is 1300×20÷(20+15.2) V=739 V. Since this is greater than discharge start voltage of 436 V of a 20 μm gap obtained from formula (1), discharged ions are generated in the gap, negative ions move toward electrode 71 and charge the image receiving layer 72 (and image receiving layer 73), and positive ions flow to the electrode 81 (and the electrode 91). When the image receiving layer 72 (and the image receiving layer 73) is charged to −(739−436)=−303 V, the electric field applied to the gap reaches discharge start voltage of 436V, whereby the discharge is stopped. Thereafter, when the applied power supply is turned off, the electrode 81 of the original plate E (and the electrode 91 of the original plate F) is grounded, and the image receiving sheet 70 is then peeled from the original plate E and original plate F, an electrostatic pattern in which the portions corresponding to the gap 82a (and 92a) of each intaglio plate is charged to −303 V is formed on the image receiving layer 72 (and the image receiving layer 73). The reason why the electrode 81 of the original plate E (and the electrode 91 of the original plate F) is grounded prior to peeling is to impart a condition wherein no separating discharge occurs on any part of the entire surface.

The electrostatic pattern on the image receiving layers on both sides of image receiving sheet becomes a visible pattern by developing with charged particles. When the charged particles are particles which can be plated, the electrode circuit pattern is formed on the image receiving layer on both sides of the image receiving sheet by performing a plating process after developing with the charged particles.

An original plate E was actually produced as follows in the same manner as the original plate of the first invention. The first electrode 81 was formed by sputtering of an ITO film onto a floating glass plate having a thickness of 2 mm. Next, the original plate E was prepared by providing a photoresist layer on the first electrode 81, overlaying a mask having a touch panel electrode circuit pattern (wiring electrode part L/S=100/100, mesh electrode part line width=5 μm) thereon, and performing UV exposure and subsequently developing to form a plate layer (intaglio plate) 82 made of a photoresist layer. Original plate F was produced in exactly the same manner.

An image receiving sheet was produced as follows. An electrode 71 was formed by sputtering of an ITO film on a PET film having a thickness of 50 μm serving as the image receiving layer 72. Next, an intermediate layer 74 (acrylic adhesive layer) having a thickness of 25 μm was applied onto the electrode 71. Subsequently, an image receiving sheet was prepared by laminating a PET film having a thickness of 25 μm as an image receiving layer 73 on the intermediate layer 74. In a state in which the electrodes of the original plate E (and the original plate F) and the image receiving sheet were grounded, first, the plate layer 82 of the original plate E and the image receiving layer 72 of the image receiving sheet 70, as well as the plate layer 92 of the original plate F and the image receiving layer 73 of the image receiving sheet 70 were adhered. Next, in the state the electrode 71 was set as the ground, −1300 V was applied between the electrode 81 of the original plate E and the electrode 71 of the image receiving sheet 70 (and between the electrode 91 of the original plate F and the electrode 71 of the image receiving sheet 70). After applying the voltage, the image receiving sheet was peeled from the original plate E and original plate F in a state in which the electrodes of both the original plate E (and original plate F) and the image receiving sheet were grounded.

The electrostatic patterns formed on the image receiving layers on both sides of the image receiving sheet were then developed with charged particles which are capable of being plated, and electroless copper plating was then performed. A set of copper electrode circuit X pattern and Y pattern for a touch panel (both wiring electrode parts L/S=100/100, mesh electrode parts line width 5 μm) can be formed on the image receiving layers on both sides of the image receiving sheet with the designed accuracy.

Furthermore, an image output experiment identical to that described above was performed using an all-nickel original plate prepared by electroforming, and the image of the recesses was accurately developed, and it was confirmed that there was no pattern on parts other than the recessed image, i.e., no traces of fog, and there was no charge in the portions where the metal was adhered to the image receiving sheet.

An example of a letterpress will be described. The same process was performed under the same conditions as the intaglio plate example above, and an electrostatic pattern in which the portions corresponding to the gaps of the letterpress were charged to −303 V was formed. In the next step, developing with the positive toner used in electrophotographic technology was performed to produce a negative visible image.

An example of a gravure plate will be described. As in the case of the intaglio plate described above, the thickness of the entire plate and the depth of gap 82a (and the gap 92a) were also 20 μm, and the depth of gap 82b (and the gap 92b) in the shallow part of the engraving corresponding to a halftone in the image was 10 μm, and when the material of the plate layer is a conductor or a semiconductor, the gap is calculated as 10 μm by the same calculation method as for the intaglio plate described above, and discharge start voltage is 374 V, the voltage applied to the gap is 516 V, and the image receiving layer 72 (and the image receiving layer 73) has an electrostatic pattern of −142 V. By making a difference in the depth of engraving on the same plate in this manner, it is possible to express halftones.

When the material of the plate layer is an insulator, the amount of charge on the image receiving layer 72 (and the image receiving layer 73) is different because the bottom surface in which the recesses are carved is charged. Since the depth of the gap 82b (and the gap 92b) is the same, discharge start voltage is also 374 V, but since the voltage applied to the gap 82b (and the gap 92b) changes by adding bottom part of 10 μm in the plate layer, if the relative permittivity of the plate layer is also the same 3.3, the voltage applied to the gap 82b (and the gap 92b) will be 1300×10/(10+15.2+3)=461 V. When the image receiving layer 72 (and the image receiving layer 73) is charged to −(461−374)=−87V, the electric field applied to the gap 82b (and the gap 92b) reaches discharge start voltage of 374V, whereby the discharge is stopped. Since the amount of positive and negative ions generated by the discharge is the same, the negative ions are charged in the image receiving layer 72 (and the image receiving layer 73), and the positive ions are charged in the carved bottom surface of the recesses of the plate layer, the generated voltage is the ratio of the capacitance of each insulator (i.e., the ratio of the thickness in terms of air), the image receiving layer 72 (and the image receiving layer 73) is charged with −73 V, and the plate layer 82 at the bottom of the gap 82*b* (and the plate layer 92 at the bottom of the gap 92*b*) is charged with +14 V. The charge on the plate layer 82 (and the plate layer 92) may be removed by an AC corona discharger or the like before subsequent printing.

Since the amount of toner adhered changes depending on the amount of charge in the image receiving layer, the charge value differs even if the engraving depth is the same due to the difference in the material of the plate layer of the gravure plate as described above, whereby the same gravure plate printing effect as that of the conventional printing can be obtained.

Figure 18:
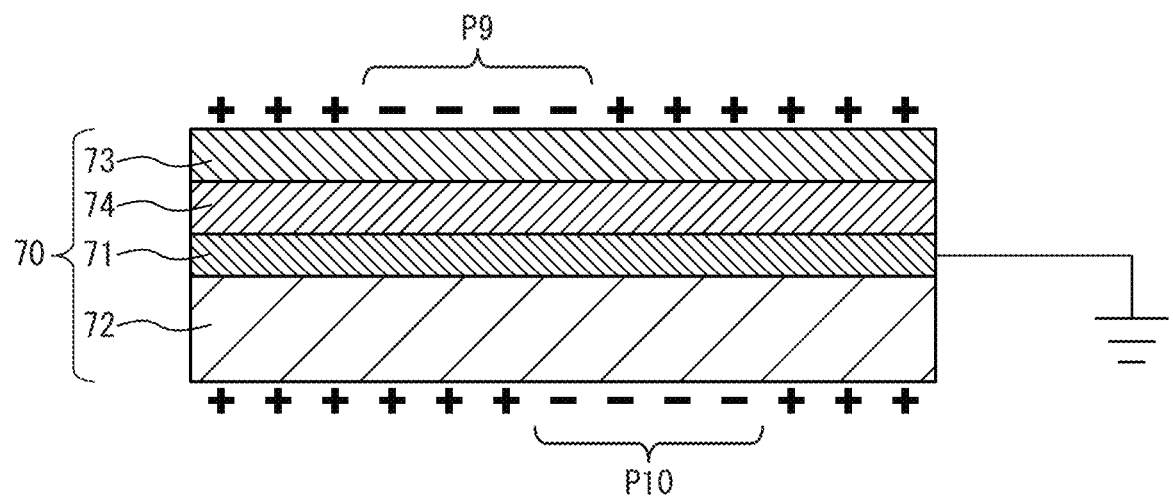
FIG. 18 is a view showing a step of peeling a mask sheet from an image receiving sheet to form an electrostatic pattern.

FIGS. 16 to 18 show a configuration in which mask sheets are arranged on both sides of an image receiving sheet and an electrostatic pattern formation process according to second aspect of the third invention.

The image receiving sheet 70 shown in FIG. 16 has the same configuration as the image receiving sheet shown in FIG. 13. The electrode 71 of the image receiving sheet 70 is grounded. Before the mask sheet M and the mask sheet L are adhered on the image receiving sheet 70, pre-charge processing is performed on both sides of the image receiving sheet 70 with a charge having the opposite polarity to the charge for forming the electrostatic pattern (+300 V in this example). This pre-charge processing ensures that the mask sheet M and the mask sheet L adhere to the image receiving sheet 70.

FIG. 17 shows an aspect in which ion irradiation is performed through the mask sheet M and the mask sheet L with ion irradiation means 100 and ion irradiation means 110, respectively in state in which the mask sheet M and the image receiving layer 73, and the mask sheet L and the image receiving layer 72 are adhered. After ion irradiation, the surface of the mask sheet M and the portion of the pattern formation surface of the image receiving sheet 70 corresponding to the ion-permeable opening M1, as well as the surface of the mask sheet L and the portion of the pattern formation surface of the image receiving sheet 70 corresponding to the ion-permeable opening L1 are charged (−300 V in this example).

FIG. 18 shows a state after peeling from the image receiving sheet 70 in a state in which the mask sheet M and the mask sheet L are grounded. An electrostatic pattern P9 is formed on the image receiving layer 73 of the image receiving sheet 70, and an electrostatic pattern P10 is formed on the image receiving layer 72. The charge in the portions shielded by the mask sheet M and the mask sheet L during ion irradiation does not change (+300 V in this sample).

The structure of the image receiving sheet is the same as the case in which the original plates are arranged on both sides of the image receiving sheet of the first aspect.

The structures of the mask sheets are the same as that of the mask sheet of the second invention.

The ion irradiation means are the same as ion irradiation means of the second invention.

Figure 19:
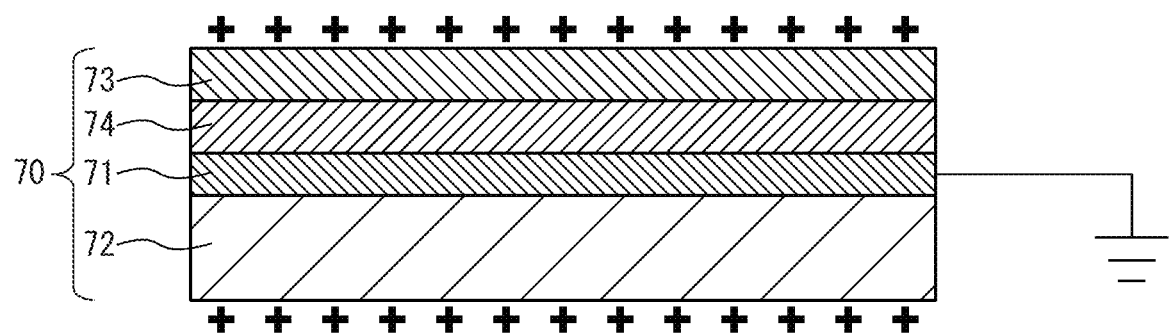
FIG. 19 is a view showing a step of performing pre-charge processing on both sides of an image receiving sheet.
Figure 20:
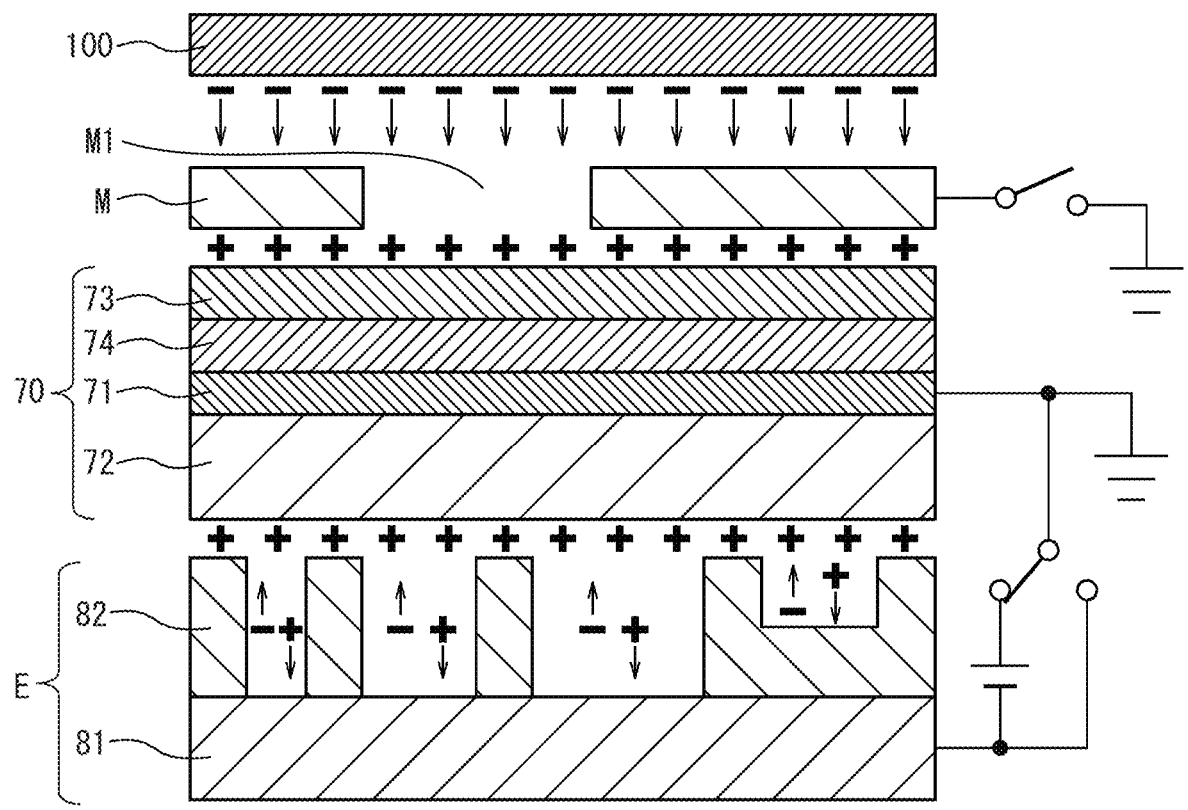
FIG. 20 is a view showing a step in which an original plate is arranged on one side of an image receiving sheet, a voltage is applied, a mask sheet is arranged on the opposite side of the image receiving sheet, and ion irradiation is performed through the mask sheet.
Figure 21:
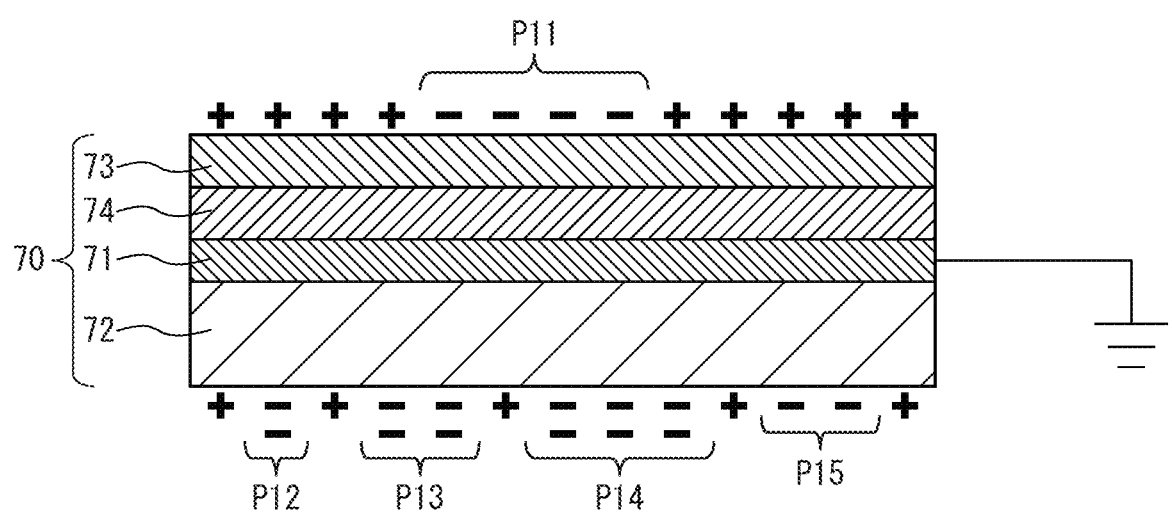
FIG. 21 is a view showing a step of peeling an image receiving sheet from an original plate and a mask sheet to form an electrostatic pattern.

FIGS. 19 to 21 show a configuration in which an original plate is arranged on one side of an image receiving sheet and a mask sheet is arranged on the other side, and an electrostatic pattern formation process according to a third aspect of the third invention.

The image receiving sheet 70 shown in FIG. 19 has the same structure as the image receiving sheet shown in FIG. 13. The electrode 71 of the image receiving sheet 70 is grounded. Before the original plate E and the mask sheet M are adhered on the image receiving sheet 70, per-charge processing is performed on both sides of the image receiving sheet 70 with a charge having the opposite polarity to the charge for forming the electrostatic pattern (+300 V in this example). This pre-charge processing ensures that the original plate E and the mask sheet M adhere to the image receiving sheet 70.

The original plate E shown in FIG. 20 has the same configuration as the original plate E shown in FIG. 13, and the mask sheet M has the same configuration as the mask sheet M shown in FIG. 17. FIG. 20 shows that in a state in which the plate layer 82 of the original plate E and the image receiving layer 72 of the image receiving sheet 70 are adhered, and the mask sheet M and the image receiving layer 73 of the image receiving sheet 70 are adhered, on the image receiving layer 72 side a voltage is applied between the electrode 81 of the original plate E and the electrode 71 of the image receiving sheet 70, and the image receiving layer 73 side the ion irradiation through the mask sheet M is performed by the ion irradiation means 100. Specifically, on the image receiving layer 72 side, by setting the electrode 71 of the image receiving sheet 70 to the ground potential and applying an appropriate voltage between the electrode 81 of the original plate E and the electrode 71 of the image receiving sheet to discharge the gap of the letterpress, intaglio plate, or gravure plate pattern of the plate layer of the original plate E, an electrostatic pattern corresponding to the letterpress, intaglio plate, or gravure plate pattern of the plate layer of the original plate E is formed on the image receiving layer 72. Conversely, on the image receiving layer 73 side, after ion irradiation, the surface of the mask sheet M and the portion of the image receiving layer 73 corresponding to the ion-permeable opening M1 are charged (−300 V in this example).

FIG. 21 shows that by peeling the image receiving sheet 70 from the original plate E after the electrode 81 of the original plate E is grounded, the electrostatic patterns P12 to P15 corresponding to the gap 82*a* and the gap 82*b* of the recesses of the plate layer 82 are formed on the image receiving layer 72. Conversely, it is shown that by peeling the mask sheet M from the image receiving sheet 70 in a grounded state, the electrostatic pattern P11 is formed on the image receiving layer 73.

The structure of the image receiving sheet, the structure of the original plate, and the structure of the mask sheet are the same as the case in which an original plate or mask sheet is arranged on both sides of the image receiving sheet.

Prior to adhesion of the original plate or mask sheet to the image receiving sheet, pre-charge processing can be performed on both sides of the image receiving sheet, whereby two effects can be obtained. First, there is a possibility that uniform adherence can be obtained. However, the charge value must be lower than discharge start voltage so that discharge does not occur until the image receiving sheet is brought closer to the original plate or mask sheet and adhered. This value is also sufficient to make the original plate and mask sheet adhere to the image receiving sheet. Second is that the electric field at the developing stage becomes large and there is a possibility that the developing efficiency will improve. Since the adsorption effect of pre-charging is the same regardless of the polarity, it is important to perform pre-charge processing with a charge having the opposite polarity to the charge for forming the electrostatic pattern.

For applications that require transparency, such as capacitive touch panels, it is necessary that all of the electrode 71, the image receiving layer 72, the image receiving layer 73, and the intermediate layer 74 be transparent. For applications that do not require transparency, the electrode 71, the image receiving layer 72, the image receiving layer 73, and the intermediate layer 74 need not all be transparent.

The following structures are conceivable for electrostatic pattern formation. When both the original plate and mask sheet are flat, A method of forming an electrostatic pattern by a mechanism such as arranging the image receiving sheet between original plates, between mask sheets, or between an original plate and a mask sheet, pressure-bonding the original plate(s) and/or mask sheet(s) to the image receiving sheet, applying a voltage on the side where the original plate(s) is adhered, applying ion irradiation on the side where the mask sheet(s) is adhered, and peeling the image receiving sheet from the original plate(s) and/or mask sheet(s) may be used. At that time, a sheet-fed image receiving sheet may be sequentially transported between original plates, between mask sheets, or between an original plate and a mask sheet, or the location where the electrostatic pattern should be formed of the image receiving sheet drawn from a roll-like shape and expanded into a strip shape may be sequentially conveyed between original plates, between mask sheets, or between an original plate and a mask sheet, and the operation described above may be performed.

Even if the original plate(s) and the mask sheet(s) are curved, a similar operation can be performed if the curvature can be controlled so that the image receiving layer on both sides of the image receiving sheet can be arranged between original plates, between mask sheets, or between an original plate and a mask sheet.

What is claimed is:

1. An electrostatic printing method, comprising:
   using an image receiving sheet, which is composed of a second electrode and an image receiving layer which is laminated on the second electrode via an adhesive layer having a peel strength of 0.01 to 0.3 N/25 mm and which can be peeled from the second electrode, and an original plate, which is composed of a first electrode having a uniform conductivity across an entire surface thereof and a plate layer having a suitable uniform thickness composed of an electrically-insulative, conductive, or semiconductive material which is integrally adhered on the first electrode and which has built-in a letterpress, an intaglio plate, or a gravure plate pattern,
   laminating the image receiving sheet onto the original plate so that the plate layer of the original plate and the image receiving layer of the image receiving sheet are adhered, and
   applying an appropriate voltage, which is sufficient to discharge the gap of the letterpress, the intaglio plate, or the gravure plate pattern, between the first electrode of the original plate and the second electrode of the image receiving sheet to form an electrostatic pattern corresponding to the letterpress, the intaglio plate, or the gravure plate pattern on the image receiving layer of the image receiving sheet.

2. The electrostatic printing method according to claim 1, comprising, prior to laminating the image receiving sheet onto the original plate, performing pre-charge processing on the image receiving sheet.

3. The electrostatic printing method according to claim 1, comprising developing the electrostatic pattern formed on the image receiving sheet with charged particles using a dry development method or a wet development method in electrophotographic technology.

4. The electrostatic printing method according to claim 3, wherein the charged particles are particles which can be plated.

5. The electrostatic printing method according to claim 1, wherein the electrostatic pattern is for producing an electrode circuit pattern of a touch panel.

6. The electrostatic printing method according to claim 1, comprising peeling the image receiving layer of the image receiving sheet from the second electrode, and producing a touch panel using the image receiving layer.

7. An electrostatic printing method, comprising:
   adhering a mask sheet a which comprises predetermined ion-permeable openings and in which an entire surface excluding at least these openings is conductive, onto a pattern formation surface of an image receiving sheet composed of an electrically insulating material,
   arranging a back surface electrode on a surface opposite the pattern formation surface of the image receiving sheet,
   performing ion irradiation through the mask sheet a, and
   peeling the mask sheet a from the image receiving layer to form an electrostatic pattern A corresponding to the ion-permeable openings on the pattern formation surface of the image receiving layer.

8. The electrostatic printing method according to claim 7, comprising, prior to adhering the mask sheet a on the image receiving sheet, performing pre-charge processing on the image receiving sheet with a charge having a polarity opposite the charge for forming the electrostatic pattern A.

9. The electrostatic printing method according to claim 7, wherein the back surface electrode is a conductive layer or a sheet with a conductive layer laminated on the surface opposite to the pattern formation surface of the image receiving sheet.

10. The electrostatic printing method according to claim 7, wherein the ion irradiation is performed by an ion irradiation means by corona discharge.

11. The electrostatic printing method according to claim 7, comprising developing the electrostatic pattern A formed on the image receiving sheet with charged particles using a dry development method or a wet development method in electrophotographic technology.

12. The electrostatic printing method according to claim 11, wherein the charge particles are particles which can be plated.

13. An electrostatic printing method, comprising:
   adhering a mask sheet a which comprises predetermined ion-permeable openings and in which an entire surface excluding at least these openings is conductive, onto a pattern formation surface of an image receiving sheet composed of an electrically insulating material,
   arranging a back surface electrode on a surface opposite the pattern formation surface of the image receiving sheet,
   performing ion irradiation through the mask sheet a, and
   peeling the mask sheet a from the image receiving layer to form an electrostatic pattern A corresponding to the ion-permeable openings on the pattern formation surface of the image receiving layer,
   after forming the electrostatic pattern A, adhering a mask sheet b comprising predetermined ion-permeable openings and in which at least an entire surface excluding the ion-permeable openings is conductive onto the pattern formation surface on which the electrostatic pattern A is formed in advance, and
   arranging a back surface electrode on a surface opposite the pattern formation surface of the image receiving sheet, performing ion irradiation through the mask sheet b, and peeling the mask sheet b from the image receiving sheet to form an electrostatic pattern B corresponding to the ion-permeable openings of the mask sheet b adjacent to the electrostatic pattern A or partially overlapped with the electrostatic pattern A.

14. The electrostatic printing method according to claim 13, wherein the back surface electrode is a conductive layer or a sheet with a conductive layer laminated on the surface opposite the pattern formation surface of the image receiving sheet.

15. The electrostatic printing method according to claim 13, wherein the ion irradiation is performed by an ion irradiation means by corona discharge.

16. The electrostatic printing method according to claim 13, comprising developing the electrostatic pattern A and the electrostatic pattern B formed on the image receiving sheet with charged particles using a dry development method or a wet development method in electrophotographic technology.

17. The electrostatic printing method according to claim 16, wherein the charge particles are particles which can be plated.

18. A double-sided electrostatic printing method, comprising the steps of:
   arranging:
      an original plate E, which comprises a second electrode having a uniform conductivity across an entire surface thereof and a plate layer having a suitable uniform thickness composed of an electrically-insulating, conductive, or semiconductive material which is integrally adhered on the second electrode and which has built-in a letterpress, intaglio plate, or gravure plate pattern, or a mask sheet L which comprises predetermined ion-permeable openings, and in which at least an entire surface excluding the ion-permeable openings is conductive, and
      an original plate F, which comprises a third electrode having a uniform conductivity across an entire surface thereof and a plate layer having a suitable uniform thickness composed of an electrically-insulating, conductive, or semiconductive material which is integrally adhered on the third electrode and which has built-in a letterpress, intaglio plate, or gravure plate pattern, or a mask sheet M which comprises predetermined ion-permeable openings, and in which at least an entire surface excluding the ion-permeable openings is conductive,
   so as to face each other, and so that the plate layers face each other when the original plate E and the original plate F are used, so as to provide a gap therebetween,
   arranging, in this gap, an image receiving sheet comprising a conductive layer, which is a first electrode, and image receiving layers laminated on both surfaces of the conductive layer,
   adhering the plate layer of the original plate E or the mask sheet L with the original plate E side or mask sheet L side of image receiving layer of the image receiving sheet, and the plate layer of the original plate F or the mask sheet M with the original plate F side or mask sheet M side of image receiving layer of the image receiving sheet,
   applying an appropriate voltage sufficient to discharge the gap of the letterpress, intaglio plate, or gravure plate pattern of the plate layer of the original plate E between the second electrode of the original plate E and the first electrode of the image receiving sheet to form, on the image receiving layer of one surface of the image receiving sheet, an electrostatic pattern corresponding to the letterpress, intaglio plate, or gravure plate pattern of the plate layer of the original plate E, or peeling the mask sheet L from the image receiving sheet to form an electrostatic pattern corresponding to the ion-permeable openings of the mask sheet L after ion irradiation through the mask sheet L has been performed, and
   applying an appropriate voltage sufficient to discharge the gap of the letterpress, intaglio plate, or gravure plate pattern of the plate layer of the original plate F between the third electrode of the original plate F and the first electrode of the image receiving sheet to form, on the image receiving layer of the opposite surface of the image receiving sheet, an electrostatic pattern corresponding to the letterpress, intaglio plate, or gravure plate pattern of the plate layer of the original plate F, or peeling the mask sheet M from the image receiving sheet to form an electrostatic pattern corresponding to the ion-permeable openings of the mask sheet M after ion irradiation through the mask sheet M has been performed.

19. The double-sided electrostatic printing method according to claim 18, wherein the original plate E and the original plate F are used.

20. The double-sided electrostatic printing method according to claim 18, wherein the mask sheet L and the mask sheet M are used.

21. The double-sided electrostatic printing method according to claim 18, wherein the original plate E and the mask sheet M are used.

22. The double-sided electrostatic printing method according to claim 18, comprising performing pre-charge processing on the image receiving sheet prior to adhering the original plate E or the mask sheet L, and the original plate F or the mask sheet M with the image receiving sheet.

23. The double-sided electrostatic printing method according to claim 18, comprising developing the electrostatic patterns formed on the image receiving sheet with charged particles using a dry development method or a wet development method in electrophotographic technology.

24. The double-sided electrostatic printing method according to claim 23, wherein the charged particles are particles which can be plated.

* * * * *